United States Patent
Jeong et al.

(10) Patent No.: US 10,045,089 B2
(45) Date of Patent: Aug. 7, 2018

(54) SELECTION OF ENCODER AND DECODER FOR A VIDEO COMMUNICATIONS SESSION

(75) Inventors: Hyeonkuk Jeong, Saratoga, CA (US); Roberto Garcia, Jr., Sunnyvale, CA (US); Xiaosong Zhou, Campbell, CA (US); Douglas S. Price, San Jose, CA (US); Joe S. Abuan, San Jose, CA (US)

(73) Assignee: APPLE INC., Cupertino, CA (US)

( * ) Notice: Subject to any disclaimer, the term of this patent is extended or adjusted under 35 U.S.C. 154(b) by 1253 days.

(21) Appl. No.: 13/196,850

(22) Filed: Aug. 2, 2011

(65) Prior Publication Data

US 2013/0034146 A1    Feb. 7, 2013

(51) Int. Cl.

| | |
|---|---|
| *H04N 21/6547* | (2011.01) |
| *H04N 21/65* | (2011.01) |
| *H04N 19/156* | (2014.01) |
| *H04N 19/103* | (2014.01) |
| *H04N 19/166* | (2014.01) |

(Continued)

(52) U.S. Cl.
CPC ......... *H04N 21/6547* (2013.01); *H04N 7/147* (2013.01); *H04N 7/15* (2013.01); *H04N 19/103* (2014.11); *H04N 19/12* (2014.11); *H04N 19/156* (2014.11); *H04N 19/166* (2014.11); *H04N 21/4788* (2013.01); *H04N 21/6379* (2013.01); *H04N 21/65* (2013.01); *H04N 19/164* (2014.11); *H04N 21/654* (2013.01)

(58) Field of Classification Search
CPC ......... H04N 21/2343; H04N 21/23439; H04N 21/25825; H04N 21/25833; H04N 21/235; H04N 21/2353; H04N 21/24; H04N 21/2402; H04N 21/2405; H04N 21/637; H04N 21/6373; H04N 21/6377; H04N 21/6379

See application file for complete search history.

(56) References Cited

U.S. PATENT DOCUMENTS 6,061,709 A * 5/2000 Bronte ..................... 718/103
6,421,465 B2   7/2002 Tan
(Continued)

FOREIGN PATENT DOCUMENTS

WO   WO 2006110975 A1 * 10/2006  ............. H04N 7/173
WO   WO 2009/128227       10/2009

OTHER PUBLICATIONS

S. Huang, "H.264 profiles and levels", Apr. 28, 2008.*
Coldfire7, "Error Resiliency and Concealment in H.264 Mpeg-4 Part 10" (Aug. 28, 2008).*

*Primary Examiner* — David N Werner
(74) *Attorney, Agent, or Firm* — Adeli LLP

(57) ABSTRACT

For a first device participating in a video communications session with a second device, some embodiments provide a method that receives sets of encoding features supported by each of one or more decoders of the second device. The method selects an encoder for the video communication session from several encoders available to the first device. The method selects a set of encoding features of the selected encoder based on the sets of encoding features received from the second device. The method transmits an encoded video bitstream to the second device along with information identifying the selected features in order for the second device to select a decoder to decode the bitstream.

31 Claims, 22 Drawing Sheets

(51) Int. Cl.
*H04N 19/12* (2014.01)
*H04N 7/15* (2006.01)
*H04N 7/14* (2006.01)
*H04N 21/4788* (2011.01)
*H04N 21/6379* (2011.01)
*H04N 21/654* (2011.01)
*H04N 19/164* (2014.01)

(56) References Cited

U.S. PATENT DOCUMENTS

| | | |
|---|---|---|
| 7,167,108 B2 | 1/2007 | Chu et al. |
| 7,456,760 B2 | 11/2008 | Normile et al. |
| 7,899,170 B2 | 3/2011 | Jeong et al. |
| 7,984,179 B1* | 7/2011 | Huang .......................... 709/233 |
| 2006/0150053 A1* | 7/2006 | van der Schaar et al. ... 714/752 |
| 2006/0173887 A1* | 8/2006 | Breitfeld et al. ............. 707/101 |
| 2008/0040453 A1* | 2/2008 | Cohen .......................... 709/219 |
| 2008/0043832 A1 | 2/2008 | Barkley et al. |
| 2008/0068446 A1 | 3/2008 | Barkley et al. |
| 2008/0129574 A1* | 6/2008 | Choi et al. ..................... 341/166 |
| 2008/0155586 A1* | 6/2008 | Yang et al. ..................... 725/32 |
| 2008/0175325 A1* | 7/2008 | Hannuksela et al. .... 375/240.26 |
| 2009/0031384 A1* | 1/2009 | Brooks et al. ................ 725/127 |
| 2009/0034933 A1* | 2/2009 | Rich ............................... 386/52 |
| 2009/0034941 A1* | 2/2009 | Kageyama et al. .......... 386/126 |
| 2009/0041113 A1* | 2/2009 | Oh ......................... H04H 20/65 375/240.01 |
| 2009/0180545 A1 | 7/2009 | Wu et al. |
| 2009/0252425 A1* | 10/2009 | Bruls et al. ................... 382/232 |
| 2009/0259766 A1* | 10/2009 | Karlsson et al. ............. 709/231 |
| 2009/0304086 A1 | 12/2009 | Shi et al. |
| 2010/0189183 A1* | 7/2010 | Gu et al. ................. 375/240.28 |
| 2010/0223647 A1* | 9/2010 | Johnston et al. ............... 725/62 |
| 2011/0063407 A1* | 3/2011 | Wang ................. H04L 12/1818 348/14.09 |
| 2011/0299604 A1 | 12/2011 | Price et al. |

* cited by examiner

SELECTION OF ENCODER AND DECODER FOR A VIDEO COMMUNICATIONS SESSION

BACKGROUND

Video encoding generally refers to a set of compression and encoding techniques used to turn video image information into a bitstream for storage or transmission (e.g., over a network). For instance, when two devices are participating in a videoconference, each device will generally capture video images, encode the video images into a bitstream, and transmit the encoded bitstream to the other device. The other device receives the encoded bitstream and decodes the data into a series of displayable video images that are similar (though generally not identical, due to a loss of information in the encoding process) to the images captured at the first device.

In some cases, the devices participating in the videoconference will be different types of devices or have different capabilities. Even if both devices are set up for the same encoding and decoding format (e.g., H.264), differences in the capabilities of the encoders may lead to difficulties in a first device understanding the bitstream from a second device. Adapting a videoconference to these differences between devices would allow for better utilization of the capabilities of different devices.

BRIEF SUMMARY

Some embodiments of the invention provide novel encoder and decoder selection methods for a content (e.g., video and/or audio) communications session between devices. A content receiving device transmits sets of encoding features supported by its decoders to a content sending device. The content sending device selects an encoder to use for encoding the content of the communications session, and selects features of the selected encoder (either all of the features or a subset of the features) to use based on the features supported by the decoders of the receiving device. The sending device begins encoding content for the communications session using the selected encoder and features, then begins transmitting the encoded bitstream to the receiving device along with information (e.g., appended to the bitstream) indicating the features used to generate the bitstream. Upon receiving an indication of the features in use, the receiving device selects a decoder for decoding the content of the communications session.

In some embodiments, the devices make some of the selections at least partially based on network conditions (e.g., packet loss rate, delay time, network data rate, etc.) between the devices and/or the operating conditions at the devices (e.g., power usage and processing and/or memory resources). For example, in some embodiments the sending device determines which encoder to use based on the network and operating conditions, independent of the feature sets supported by the decoders. The sending device then determines which of the features available to the selected encoder it can use, based on the features available to the decoders of the receiving device. However, depending on the network and operating conditions, the sending device may only use some of these features. Finally, in some embodiments the receiving device has a priority order for decoder use based on its local conditions, and uses the highest priority decoder that supports all of the features used to generate the encoded bitstream.

In some cases, the network or operating conditions might change, causing the sending device and/or the receiving device to make changes to its setup. For example, if a user moves a device closer to a wireless router, the number of dropped packets may decrease, thereby removing a need for error-resilient features. As another example, a user might start up another application on the sending device that uses a significant amount of processor resources.

As a result, the sending device might switch to using a different encoder, or the same encoder with a different set of features. When the sending device makes a change to the encoding features, the device transmits these changes to the receiving device, which can then switch to using the highest priority decoder that supports all of the features used to generate the new bitstream. In addition, the receiving device might switch to using a different decoder because the conditions change and the device reprioritizes its decoders.

The above paragraphs describe a particular sending device and receiving device. One of ordinary skill in the art will recognize that in many cases (e.g., for a videoconference) both devices actually perform both the sending and receiving functions. Based on decoding feature sets received from a first device, a second device selects its encoder and encoding features and transmits this information to the first device, which selects its decoder. While this is ongoing, the first device selects its encoder and encoding features (based on decoding feature sets received from the second device) and transmits this information to the second device, which selects its decoder.

In addition, in some embodiments the content communications session includes more than two devices. For a particular device transmitting encoded content to two or more receiving devices, the method of some embodiments exchanges feature sets with each of the receiving devices. After selecting an encoder, the sending device determines which encoding features to use based on the features supported by decoders of both devices, as the sending device will only encode one bitstream to send to both devices in some embodiments. The receiving devices can then select decoders based on the features used to generate the encoded bitstream.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details, examples and embodiments are set forth for purpose of explanation. However, one of ordinary skill in the art will realize that the invention is not limited to the embodiments set forth and that the invention may be practiced without some of the specific details and examples discussed. In other instances, well-known structures and devices are shown in block diagram form in order not to obscure the description of the invention with unnecessary detail.

Some embodiments of the invention provide novel encoder and decoder selection methods for a content (e.g., video and/or audio) communications session between devices. A content receiving device transmits sets of encoding features supported by its decoders to a content sending device. The content sending device selects an encoder to use for encoding the content of the communications session, and selects features of the selected encoder (either all of the features or a subset of the features) to use based on the features supported by the decoders of the receiving device. The sending device begins encoding content for the communications session using the selected encoder and features, then begins transmitting the encoded bitstream to the receiving device along with information (e.g., appended to the bitstream) indicating the features used to generate the bitstream. Upon receiving an indication of the features in use, the receiving device selects a decoder for decoding the content of the communications session.

Figure 1:
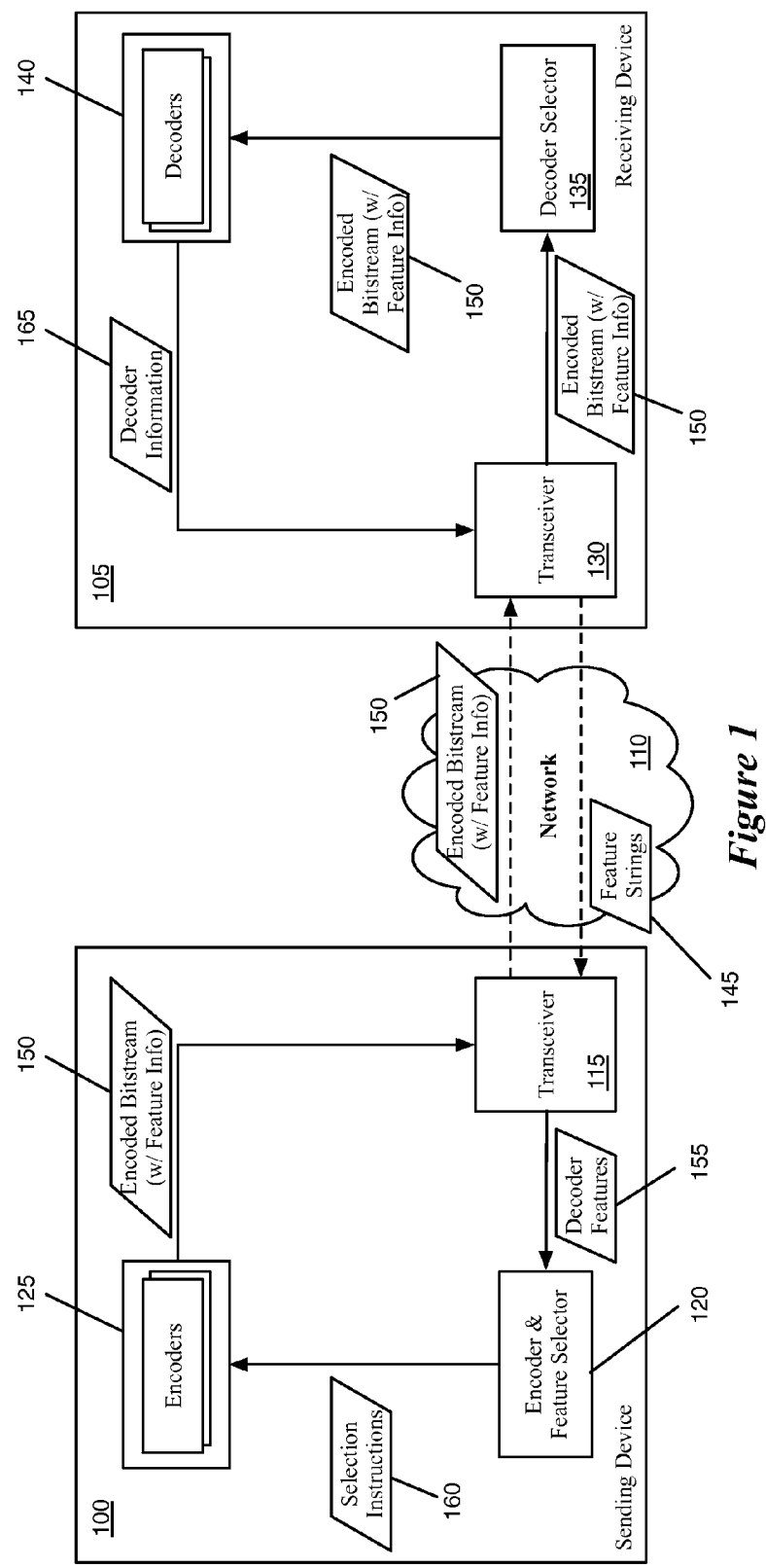
FIG. 1 conceptually illustrates a sending device and a receiving device of a videoconference that communicate through a network.

FIG. 1 conceptually illustrates such a sending device 100 and a receiving device 105 that communicate through a network 110. In some embodiments, the devices 100 and 105 may be any sort of electronic device or system capable of encoding and/or decoding the encoded content (e.g., a laptop computer, desktop computer, tablet computer, smart phone, etc.). The sending device 100 includes a transceiver 115, an encoder and feature selector 120, and a set of encoders 125. The receiving device 105 includes a transceiver 130, a decoder selector 135, and a set of decoders 140. In some embodiments, some or all of these modules (e.g., the encoder and feature selector 120 and decoder selector 135) are part of videoconferencing applications operating on the devices.

The sending device transceiver 115 is shown receiving feature strings 145 from the receiving device 105 and sending an encoded bitstream 150 to the receiving device. In some embodiments, the transceiver 115 includes component modules for handling call signaling (e.g., conference setup) as well as transmitting an encoded bitstream of conference content and feature usage information. The transceiver 115 may include an image buffer for storing encoded video images to transmit, and may perform packetization of the images and add headers to the packets. In some embodiments, though, the images are packetized by the encoder that encodes the images.

The encoders 125 encode content for the content communications session according to a particular format. In some embodiments, the encoders include at least one hardware encoder (e.g., a chip (such as an ASIC) or card designed specifically for encoding that is part of the sending device) and at least one software encoder (e.g., software running on the sending device that utilizes one or more processing units of the sending device to perform encoding operations). The sending device generally uses one encoder at a time to encode content for the content communications session. Each encoder supports a different set of encoding features in some embodiments.

In some embodiments, the features supported by the encoders are features that modify the bitstream generated by the encoder for a particular encoding format. Some embodiments always use a particular encoding format (e.g., H.264), but then the actual generation of the bitstream for the content according to the format varies based on the features currently in use. Examples of features used in some embodiments include video resolution adaptation (VRA), reference VRA (RVRA), long-term reference frame (LTR), adaptive video sharpening (AVS), bandwidth probing, visible rectangle (VRect) as well as other features. The features may provide error resiliency, maintain a higher quality while lowering the bit rate, etc. Details of these features will be described further below.

The encoder and feature selector 120 receives the decoder feature information 155 and uses this information to select one of the encoders 125 for use during the content communications session, and subsequently select a set of encoding features for the encoder to use in encoding the content. Some embodiments select the encoder based at least partially on network conditions (e.g., packet loss rate, delay time, etc.) detected by the devices and/or the operating conditions at the devices (e.g., processing and/or memory resources in use). In some embodiments, the videoconferencing application includes a module for analyzing network data. For example, if the central processing unit(s) of the sending device are under heavy workload, the sending device might use a hardware encoder so that the encoding will require minimal CPU resources. Some embodiments generally start a content communications session using an encoder with error-resilient features because the network conditions cannot yet be determined accurately.

The encoder and feature selector 120 also selects a set of the features supported by the selected encoder (either all of the features or a subset of the features) based on the features supported by the decoders of the receiving device. In some embodiments, the set of features can include any features supported by the decoders of the receiving device, so long as all of the selected features are supported by a single decoder. In addition, based on the network and/or operating conditions known to the sending device, the device may choose to only use some of the selected features to generate the encoded bitstream. For instance, if almost no packets are being dropped, then the device may choose not to use the LTR feature, as this is an error resiliency feature.

The transceiver 130 of the receiving device 105 is similar to the transceiver 115 of the sending device 100. The transceiver 130 is shown sending feature strings 145 and receiving the encoded bitstream 150, which it passes to the decoder selector 135. In some embodiments, the transceiver 130 includes component modules for handling call signaling (e.g., conference setup), generating feature strings based on decoder information, and receiving the encoded bitstream of conference content and feature usage information.

The decoders 140 decode content received from the sending device 100 for the content communications session. In some embodiments, the decoders include at least one hardware decoder (e.g., a chip (such as an ASIC) or card designed specifically for decoding that is part of the receiving device) and at least one software decoder (e.g., software running on the receiving device that utilizes one or more processing units of the receiving device to perform decoding operations). The receiving device generally uses one decoder at a time to decode content for the content communications session. Each decoder supports a different set of encoding features in some embodiments, and the decoder in use has to be able to support the features that were used to encode the bitstream.

The decoder selector 135 identifies the features used by the encoder of the sending device 100 to encode the received bitstream, and uses this information to select a decoder to decode the bitstream. In some embodiments, the receiving device has a priority order for decoder use based on the current operating conditions (e.g., preferring a hardware decoder if the CPU is under a heavy workload). In this case, the decoder selector 135 chooses the highest priority decoder that supports all of the features used to generate the encoded bitstream. Some embodiments will always select the hardware decoder if it supports all features in the bitstream because the hardware decoder uses less power and fewer processing resources.

The operation of the devices 100 and 105 to set up and participate in a content communications session will now be described. The transceiver 130 generates a set of feature strings 145 that indicate the different sets of features supported by the decoders 140, using decoder information 165 retrieved about the decoders. The feature strings, in some embodiments, are a way of encoding the information about the different decoders and the features they support for transmission to other devices. In some embodiments, these feature strings indicate both the features supported by the decoders as well as how the sending device 100 should provide information about the usage of the features to the receiving device 105 within the encoded bitstream.

The sending device transceiver 115 receives these feature strings 145 and passes the decoder feature information 155 to the encoder and feature selector 120. Using this information, along with network conditions (which may not be known at the start of the communications session) and the current operating conditions at the device 100, the encoder and feature selector 120 selects an encoder from the set of encoders 125. The selector 120 also chooses a set of features supported by the chosen encoder (either all or a subset of the features) to use for encoding the content. As shown, the encoder and feature selector sends selection instructions 160 to the selected encoder indicating that it should begin encoding the content using a particular set of features.

The selected encoder then begins encoding content (e.g., video images captured at the device) in order to generate an encoded bitstream 150. The encoded bitstream includes not only the encoded content but feature usage information in some embodiments. This information includes an indication as to which features were used to generate the bitstream and information about the features. In the case of a videoconference, some embodiments append the feature usage information to the end of the bitstream for each image to indicate the features used to generate that image. The transceiver 115 transmits the bitstream 150 across the network 110 to the receiving device 105, where it is received by the transceiver 130.

The transceiver 130 sends the bitstream 150 to the decoder selector 135. The decoder selector 135 determines the features used to generate the bitstream (by analyzing the bitstream) and uses a prioritized list of the decoders (e.g., stored in memory) to identify the highest priority decoder that supports all of the features in the bitstream.

As shown, the decoder selector 135 passes the encoded bitstream 150 to the selected decoder to indicate that the decoder should begin decoding the bitstream into playable content. In some embodiments, the decoder selector actually indicates to the transceiver 130 or a component of the transceiver that the encoded bitstream should be routed to a particular selected decoder. The particular selected decoder can then begin decoding the bitstream.

In some cases, the network or operating conditions might change, causing the sending device and/or the receiving device to make changes to its setup. For example, if a user moves a device closer to a wireless router, the number of dropped packets may decrease, thereby removing a need for error-resilient features. As another example, a user might start up another application on the sending device that uses a significant amount of processor resources.

As a result, the sending device might switch to using a different encoder, or the same encoder with a different set of features. As such, the encoder and feature selector 120 of some embodiments is regularly (e.g., continuously) evaluating the network conditions and/or the power and resource consumption at the sending device 100 to determine whether to switch encoders and/or encoding features. When the encoder and feature selector 120 chooses a new encoder (or new features for the same encoder), it sends new instructions 160 to the selected encoder indicating which features should be used.

When the sending device makes a change to the encoding features, the device transmits these changes to the receiving device, which can then switch to using the highest priority decoder that supports all of the features used to generate the new bitstream. In addition, the receiving device might switch to using a different decoder because the conditions change and the device reprioritizes its decoders.

The above paragraphs describe a particular sending device and receiving device. One of ordinary skill in the art will recognize that in many cases (e.g., for a videoconference) both devices actually perform both the sending and receiving functions. A first device selects its encoding features and transmits this information to a second device, which selects its decoder. While this is ongoing, the second device selects its encoding features and transmits this information to the first device, which selects its decoder.

In addition, in some embodiments the content communications session includes more than two devices. For a particular device transmitting encoded content to two or more receiving devices, the method of some embodiments exchanges feature sets with each of the receiving devices. After selecting an encoder, the sending device determines which encoding features to use based on the features supported by decoders of both devices, as the sending device will only encode one bitstream to send to both devices in some embodiments. The receiving devices can then select decoders based on the features used to generate the encoded bitstream.

FIG. 1 illustrates an example pair of devices that select an encoder and decoder for a content communications session. Several more detailed embodiments are described below. Section I describes the encoder and decoder selection for a videoconference of some embodiments, while Section II describes the switching of encoders and decoders during a videoconference. Section III describes the format of messages used in the videoconference of some embodiments. Section IV then describes the software architecture of a video-conferencing application of some embodiments. Finally, Section V describes an electronic system with which some embodiments of the invention are implemented.

I. Initial Selection of Encoder and Decoder

As indicated above, each of the devices participating in a content communications session goes through a process to select an encoder (for the sending device) and a decoder (for the receiving device). The following section describes, in subsection A, a detailed process of some embodiments for selecting an encoder and encoding features and, in subsection B, a detailed process of some embodiments for selecting a decoder. Subsection C then describes additional examples of encoder and decoder selection. In some embodiments, each device in the content communications session performs both processes because content flows in both directions. This section will describe the content being transmitted as video and the different features introduced are specific to video encoding. However, one of ordinary skill will recognize that the processes are also applicable to encoding other types of content for transmission, such as audio.

A. Encoder and Feature Selection

Figure 2:
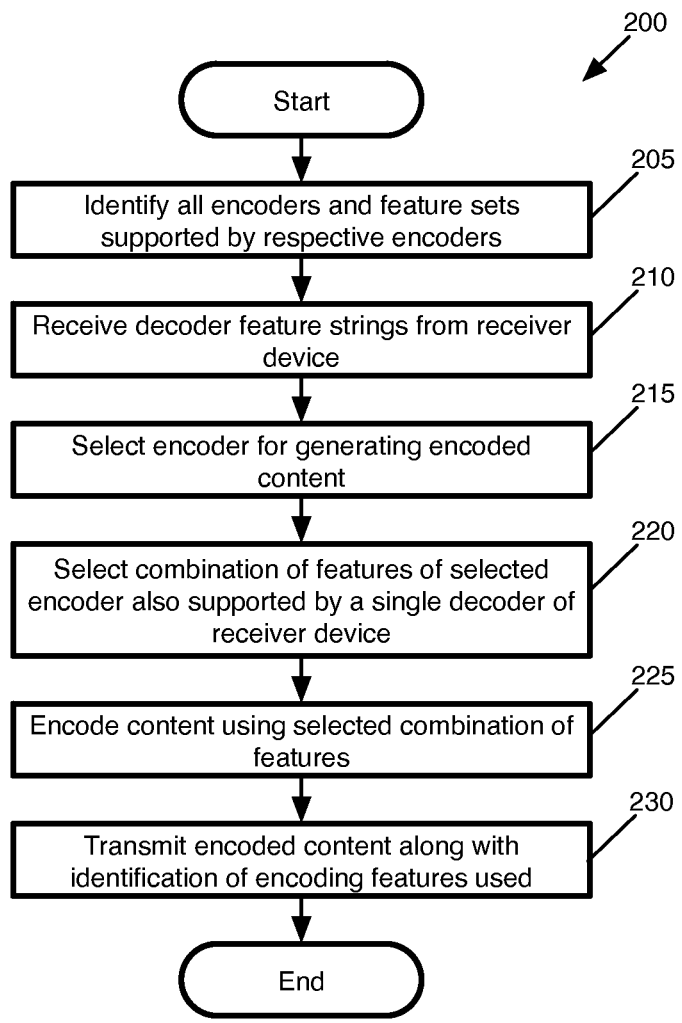
FIG. 2 conceptually illustrates a process of some embodiments for selecting an encoder and encoding features for a content communications session.
Figure 3:
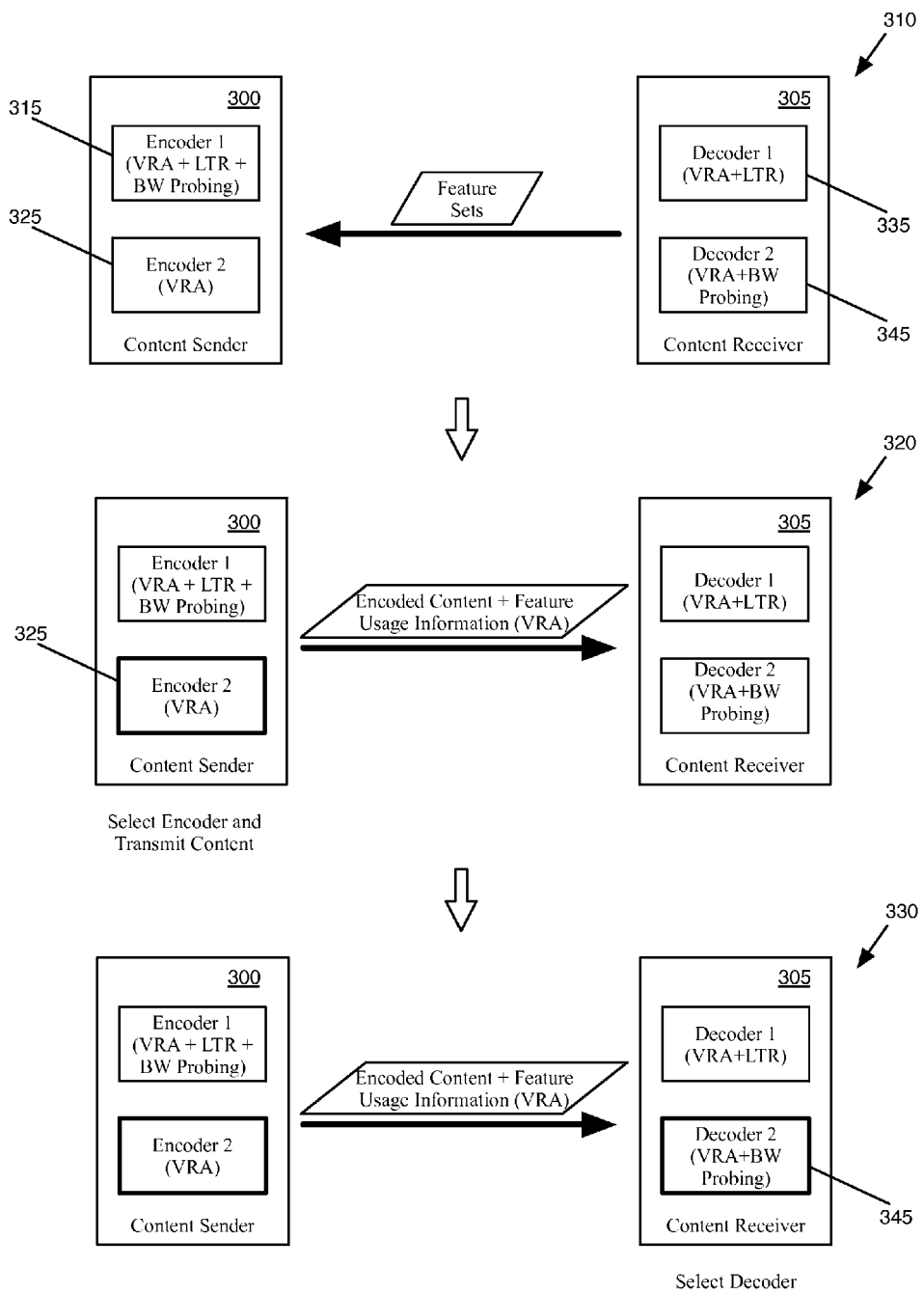
FIGS. 3 and 4 illustrate the setup for a video communications session between a content sending device and a content receiving device.
Figure 4:
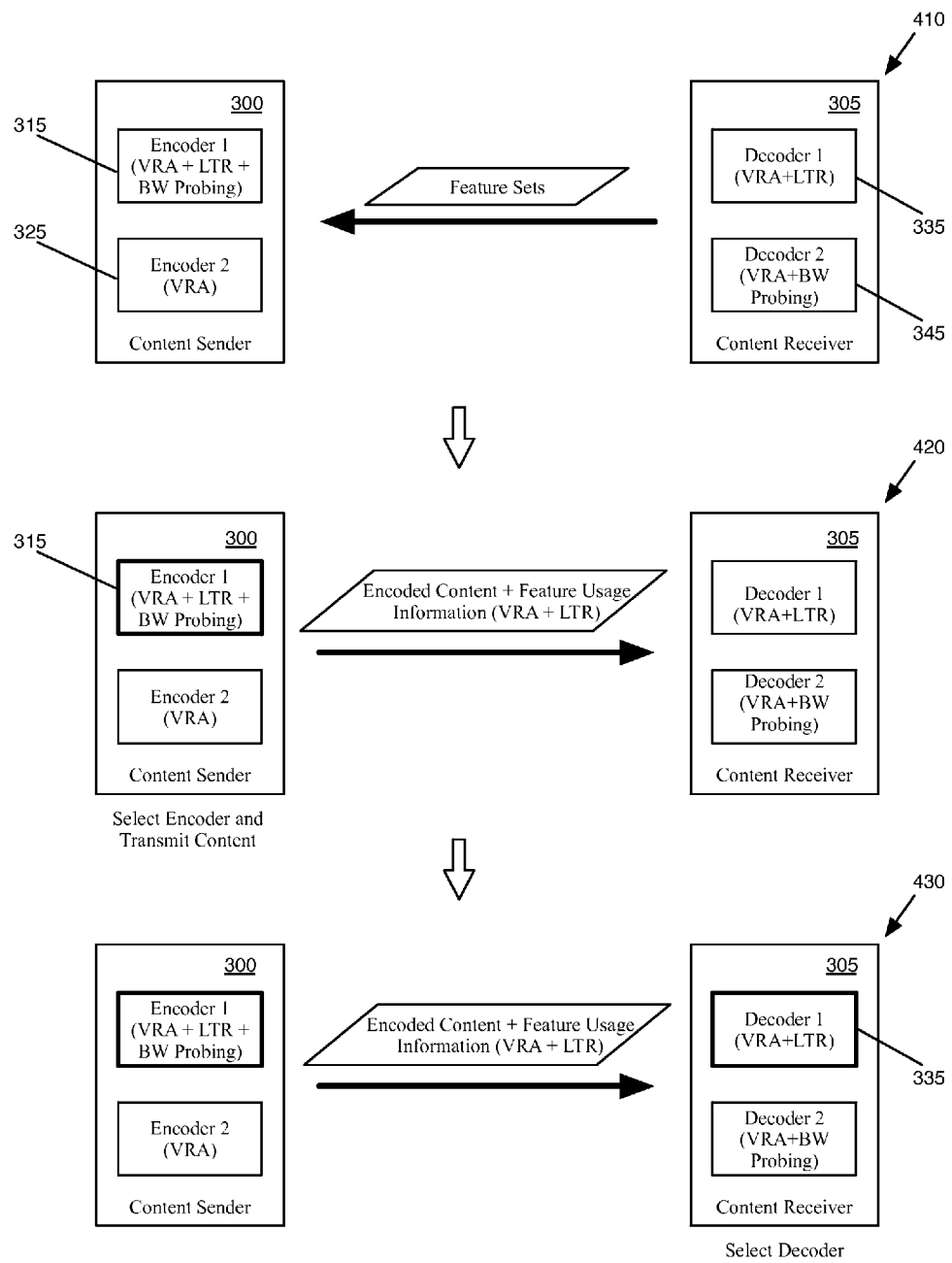

FIG. 2 conceptually illustrates a process 200 of some embodiments for selecting an encoder and encoding features for a content communications session. The process 200 will be described by reference to FIGS. 3 and 4, which illustrate the setup for a video communications session between a content sending device 300 and a content receiving device 305, as well as FIG. 5, which illustrates a more detailed software architecture of such a content sending device. Each of FIGS. 3 and 4 illustrates the setup over three stages.

Figure 5:
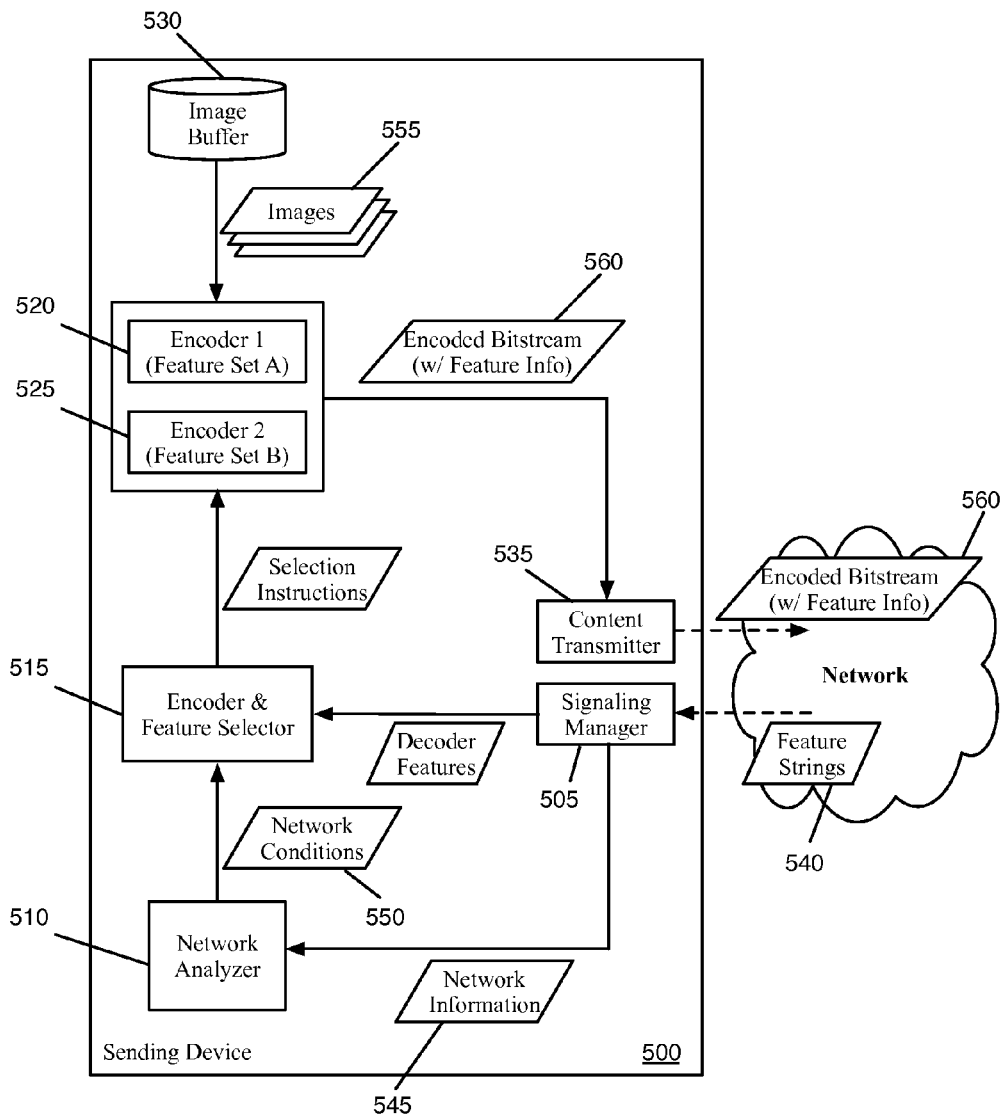
FIG. 5 conceptually illustrates the software architecture of a content sending device of some embodiments.

FIG. 5, as mentioned, conceptually illustrates the software architecture of a content sending device 500 of some embodiments. Specifically, the sending device 500 encodes and transmits video for a videoconference. The sending device 500 includes a signaling manager 505, a network analyzer 510, an encoder and feature selector 515, a first encoder 520, a second encoder 525, an image buffer 530, and a content transmitter 535.

The signaling manager 505 handles the call signaling for the video conference. This involves setting up the video-conference (e.g., setting up the network connections between the sending device 500 and one or more receiving devices). In addition, in some embodiments the receiving device transmits its decoder feature strings 540 during call signaling. In some embodiments, the signaling manager identifies network information such as the number of packets dropped, delay time, etc. This information may come from tests performed within the encoded bitstream and/or separate from the encoded bitstream in various embodiments.

The network analyzer 510 of some embodiments receives the network information 545 from the signaling manager and calculates various network statistics. For example, the network analyzer 510 calculates packet loss rate, latency time, and data rate in some embodiments. In some embodiments, the sending device 500 also receives content (i.e., also acts as a receiving device such as that shown in FIG. 12), and network information encoded in a received bitstream is also sent to the network analyzer 510.

The network analyzer identifies the network conditions and passes this information 550 to the encoder and feature selector 515. In some embodiments, the encoder and feature selector is actually two separate modules that first select an encoder and then select features for the encoder. In other embodiments, however, the decision as to which encoder to use is made accounting for the features supported by the different encoders. As will be described in detail below, the encoder and feature selector 515 of some embodiments identifies (i) an encoder to use for encoding outgoing video images and (ii) which encoding features of the selected encoder to use. The encoder and feature selector 515 of some embodiments selects the encoder and features based on the network conditions 550, conditions at the device (e.g., current processing resource usage), the features supported by the different encoders, and the power consumption of the different encoders.

The encoders 520 and 525 are each capable of encoding images 555 for transmission to a receiving device as part of a videoconference. The encoders may be software encoders, hardware encoders, or both. In some embodiments, both encoders encode images using the same format (e.g., H.264), but support different features that may optionally be used in encoding the images. In this case, the first encoder

520 supports feature set A while the second encoder 525 supports feature set B. Some of these features are described in further detail below.

The image buffer 530 receives unencoded images (e.g., sets of ordered pixel values) from a camera (not shown) at the device, which may be part of the sending device 500 or attached to the sending device 500. These images 555 are stored in the image buffer 530 until the selected encoder (either encoder 520 or encoder 525) retrieves them for encoding. The selected encoder generates an encoded bitstream 560 and appends feature usage information to the bitstream. The content transmitter 535 transmits the encoded bitstream 560 to one or more receiving devices through a network.

The operation of FIG. 5 will be described by reference to the process 200. In some embodiments, the process 200 begins when two devices start up a content communications session. The remainder of this discussion will refer to a videoconference, in which the sending device encodes and transmits video to the receiving device (though not shown in FIGS. 3-5, the receiving device may also act as a sending device and vice versa in the videoconference). The process 200 is performed, in some embodiments, by a device that will act as a transmitter of video during the conference (e.g., sending device 500). In some cases, both devices will perform process 200 or a similar encoding feature selection process.

In some embodiments, the process 200 starts during a call signaling phase of a videoconference. The call signaling phase is used by the devices in the conference to establish any necessary connections (e.g., directly between the devices, between the devices and intermediary network elements, etc.) and negotiate terms of the videoconference (e.g., video and audio encoding formats, etc.).

As shown, the process begins by identifying (at 205) all encoders and the feature sets supported by the respective encoders. That is, for each encoder available to the sending device, the set of features that the encoder supports is identified. In some embodiments, the device stores this information for easy retrieval. For example, the videoconference might be performed by a videoconferencing application, and at time of startup the application identifies all of the encoders and their features (e.g., by querying the encoders), then stores this information in memory (e.g., RAM). Other embodiments store the information in permanent memory (e.g., in a data file), or query the different encoders when starting a videoconference.

In the case of FIGS. 3 and 4, the content sender 300 has available a first encoder 315 that supports video resolution adaptation (VRA), long-term reference frames (LTR), and bandwidth (BW) probing, and a second encoder 325 that supports only video resolution adaptation. As mentioned above, in some embodiments the features that are exchanged in the feature sets are modifications to the way a frame is encoded by a particular codec (e.g., H.264). That is, the same encoder using the H.264 codec will encode an image differently when a particular feature is used than when the particular feature is not used.

The video resolution adaptation feature of some embodiments allows the sending device to change the resolution of the encoded video on a per-image basis. While a camera will generally capture a constant image size, the encoder can encode these images at varying resolutions depending on the complexity of the different images and the bandwidth available for transmitting the images.

In a system using the long-term reference frame feature of some embodiments, the decoder saves a last reference frame (e.g., an I frame, or image encoded without reference to any other image). If there is a transmission error (e.g., a dropped frame, dropped packet, etc.), the encoder encodes the next image by reference to the reference frame rather than transmitting a new I frame, as the I frames use significantly more bandwidth than images encoded by reference to other images. Some embodiments use the LTR feature when the network is more likely to be dropping packets.

The bandwidth probing feature of some embodiments is a mechanism by which the encoder identifies the available bandwidth on the network between the two devices. Once the bandwidth is identified, the encoder can decide on the appropriate bit rate for the video stream it sends over the network. This can affect the resolution (if using VRA), quantization parameter used to quantize the video image, etc.

These features represent only a subset of the video encoding features that might be present in some embodiments. Examples of additional features include reference VRA (a variation on the video resolution adaptation feature that changes the size of the long-term reference frame), adaptive video sharpening (a post-processing feature in which the encoder sends statistics gathered about the encoding process to the decoder for use in performing post-decoding sharpening), and visible rectangle (a feature in which only a portion of a captured image is actually encoded and transmitted, such as when a camera captures a landscape image but only a portion having a portrait aspect ratio is encoded and sent). In addition, the method of some embodiments can be used to adaptively use any other encoding features.

The process then receives (at 210) a set of decoder feature strings from the receiver device. These feature strings, described further in Section III below, indicate the features supported by the decoders of the receiver device. As shown in FIG. 5, these strings are received through a network by the signaling manager 505 or a similar receiver module of the content sending device. The first stage 310 of FIG. 3 illustrates that the receiving device 305 transmits its decoder feature sets to the sending device 300. That is, the sending device 300 receives, from the receiving device 305, a first feature string indicating the presence of a decoder 335 with VRA and LTR features and a second feature string indicating the presence of a decoder 345 with VRA and BW probing features. The first stage 410 of FIG. 4 illustrates the same transmission of feature strings from the device 305 to the device 300.

The illustrated examples in FIGS. 3 and 4 assume only one receiver device 305, but in some embodiments there may be more than two devices participating in the videoconference. In such situations, some embodiments receive the decoder feature strings from all receiver devices. This enables the sending device to make its determination as to which encoding features to use for the videoconference based on the features available to all the decoders on all of the devices to which the sender will be sending its encoded video.

In addition, some embodiments also transmit the encoder feature strings to the receiving device for use in selection of a decoder. For instance, if there is a likelihood that a sending device will start using a particular feature mid-session, the receiving device might select a decoder with the particular feature in order to avoid having to switch decoders during the conference.

As mentioned above, in some embodiments the transmission of feature sets (i.e., operation 210) is part of the call signaling process of the videoconferencing application. In some embodiments, each device acts as both a sender and receiver, and thus both sends its decoder features to and receives the decoder features from the other device. In some embodiments, the device initiating the video conference transmits its decoder feature strings first, then the other, non-initiator devices transmit their decoder feature strings back to the initiating device (and to each other, if necessary).

With the decoder feature strings received, the process 200 selects (at 215) an encoder for generating encoded content (e.g., video) for the videoconference. As described above, in some embodiments this is performed by the encoder and feature selector 515. The second stage 320 of FIG. 3 illustrates the case in which the sending device 300 selects the second encoder 325, while the second stage 420 of FIG. 4 illustrates the case in which the sending device 300 selects the first encoder 315.

In some embodiments, the sending device selects an encoder based on one or more different factors. For instance, in one scenario, the sending device will initially use a software encoder that includes various error-resilient features (e.g., usage of a long-term reference frame), then switch to a faster hardware encoder that consumes less power and processing resources once enough data has been gathered to determine that the network over which the videoconference is being held is not dropping packets. The sending device of some embodiments selects the encoder based on a combination of the resource and power usage of the different encoders (and the current resource usage of the device), the features supported by the different encoders, the decoded video quality at the receiving device (which is based on the network conditions between the devices) for different combinations of features. Further details regarding the encoder selection will be described below by reference to FIG. 6 below.

With the encoder selected, the process 200 selects (at 220) a combination of features of the selected encoder that are supported by a single decoder of the receiver device. This may also be performed by the encoder and feature selector 515 in some embodiments. When multiple devices will be receiving the encoded video from the sending device, then the selected combination of features must be supported by at least one decoder at each of the receiving devices. In some embodiments, however, the sending device encodes video separately for each receiving device, and thus selects an encoder and feature set separately for each encoded bitstream.

In FIG. 3, the selected encoder 325 only supports the VRA feature, which is supported by both of the decoders at the receiving device. In this case, the device selects the use of the VRA feature. In some embodiments, different features are used differently. Certain features that will provide a benefit in any situation are used whenever the encoder supports the feature and a decoder at the receiving device also supports the feature. Other features may only be used when the network and/or operating conditions are good (e.g., a feature that enhances the image quality). For example, if the feature increases the size of the bitstream for a video image, some embodiments only use the feature when packets are not being dropped and the time delay between the devices is low. On the other hand, some features are designed for less ideal network conditions. The long-term reference frame feature, for instance, is useful for error correction when packets are dropped, so some embodiments use this feature when dropped packets are more common (e.g., because the user of one of the devices is on an overtaxed network or has poor wireless signal quality).

In FIG. 4, the selected encoder 315 supports the VRA, LTR, and BW probing features. However, the decoders 335 and 345 of the receiving device 305 support different combinations of these features. The first decoder 335 supports the VRA and LTR features, while the second decoder 345 supports the VRA and BW probing features. Thus, the sending device is presented with a choice to either use the VRA feature or not use the VRA feature, depending on whether the conditions dictate its use.

However, the sending device cannot choose both the LTR feature and the BW probing feature, and is thus presented with a choice between using one, the other, or neither. If neither feature is useful given the current conditions, then the sending device will not use either. If both are useful, then a preference will be given to one of the two features. In some cases, the decision will be between one group of desired features and a different group of desired features (or several such groups). For example, if the decoder 345 did not support bandwidth probing, then in FIG. 4 the decision would be between using VRA and LTR or using BW probing. Some embodiments assign a preference score to each feature and select the group of features with the highest score. Other embodiments select the group containing the feature with the highest score (i.e., the most important feature given the current conditions). For instance, LTR (or other error resilient features) might be the most important feature at the start of the videoconference when the sending device is unaware of the network conditions, and thus would always be used regardless of the other possible features. When the sending device has more information about the network conditions, it could then assign a lower importance score to the LTR feature and use different features instead.

Returning to FIG. 2, once the encoder and features are selected, the process begins encoding (at 225) content (e.g., video) using the selected combination of features. That is, the process takes unencoded video images and encodes the video images with the selected encoder according to the selected features. In some embodiments, the selected features modify how the encoder encodes the video. For instance, an H.264 encoder using the VRA feature will encode at least a subset of the images differently than an H.264 encoder without the VRA feature.

For a videoconference, in some embodiments a camera at the sending device (e.g., part of the sending device or connected to the sending device) captures the video images and sends the images to the selected encoder (or to an image buffer such as buffer 530 from which the encoder retrieves images as necessary). For instance, some devices (e.g., smart phones, some computers, some tablets) have built-in cameras, while other devices require the user to connect a separate camera with a wired or wireless connection. These cameras capture the video images as bitmaps of pixel values, which are compressed into an encoded bitstream by the encoder.

The process 200 transmits (at 230) the encoded content along with an identification of the encoding features used to encode the content, then ends. In some embodiments, the data for each encoded image is transmitted as a set of packets. Some embodiments enable the features to change on a per-image basis, and append the feature information for each image to the end of the image data. In addition to indicating which features are used to encode the particular image, some embodiments also include data about the particular feature. For instance, if using the VRA feature, the appended information will include an indication that VRA is turned on as well as information indicating the resolution of the current image, which is information necessary to properly decode the image. Similarly, if using the video sharpening feature, the sending device appends encoding statistics to the image data.

FIGS. 3 and 4 illustrate, at stages 320 and 420 respectively, that the sending device 300 transmits encoded content (i.e., audio and/or video) along with the feature usage information to the receiving device 305. In stage 320, this indicates that the VRA feature is being used, while in stage 420, the information indicates that the VRA and LTR features are being used (the LTR feature might have been chosen, e.g., because dropped packets were likely). The information would also include resolution information for the VRA feature. Some embodiments, though, only indicate which features are in use at the start of the videoconference and any time the features change. That is, if the features are the same from one image to the next, the sending device will not need to indicate this in the bitstream. The feature information (e.g., encoded video resolution information) will need to be included in the bitstream for each image, however.

One of ordinary skill in the art will recognize that the encoding and transmitting process will continue for the duration of the videoconference in some embodiments. In fact, operations 225 and 230 may not be performed in a linear fashion. Once call signaling is finished and a data connection between the sending and receiving devices is established, the sending device will continuously encode video and transmit that video. That is, the selected encoder (either encoder 520 or encoder 525) will continue to retrieve new images from the image buffer 530 to generate the encoded bitstream 560 and embed the feature usage information in the bitstream. The content transmitter 535 will continue to transmit the bitstream 560 as the encoder generates the bitstream. In some embodiments, the initial identification of the selected features is actually sent earlier in the process, as part of the call signaling stage (i.e., before the device starts encoding the video images).

As shown at stages 330 and 430, the receiving device makes a selection of a decoder based on the encoder features used by the sending device. In FIG. 3, the receiving device selects decoder 345, although either decoder could be selected as both support the VRA feature. In FIG. 4, the receiving device selects decoder 335, because it is the only decoder available that supports both the LTR and VRA features. The process performed by a receiving device will be described in further detail in the subsection below.

In some embodiments, the sending device selects an encoder irrespective of the features supported by the different encoders or the features supported by the decoders of the receiving device. For instance, the sending device might choose between a hardware and software encoder based on the operating conditions at the device (e.g., preferring a software encoder unless the current CPU or RAM usage at the device is above a particular threshold) and/or the network conditions known to the device (e.g., preferring a particular encoder when the packet loss rate is especially high or especially low). In stage 320 of FIG. 3, the sending device 300 might have selected the second encoder 325 because the encoder 325 is preferred under the current conditions, even though the first encoder supports additional features which are also supported by the decoders of the receiving device.

Figure 6:
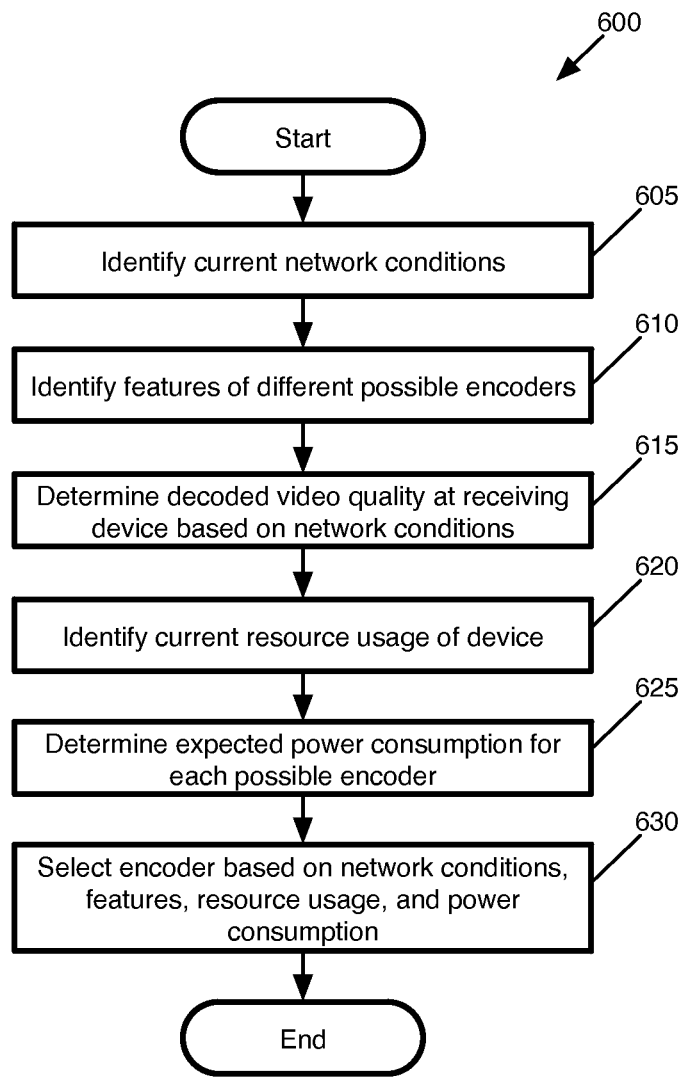
FIG. 6 conceptually illustrates a process of some embodiments for selecting an encoder.
Figure 7:
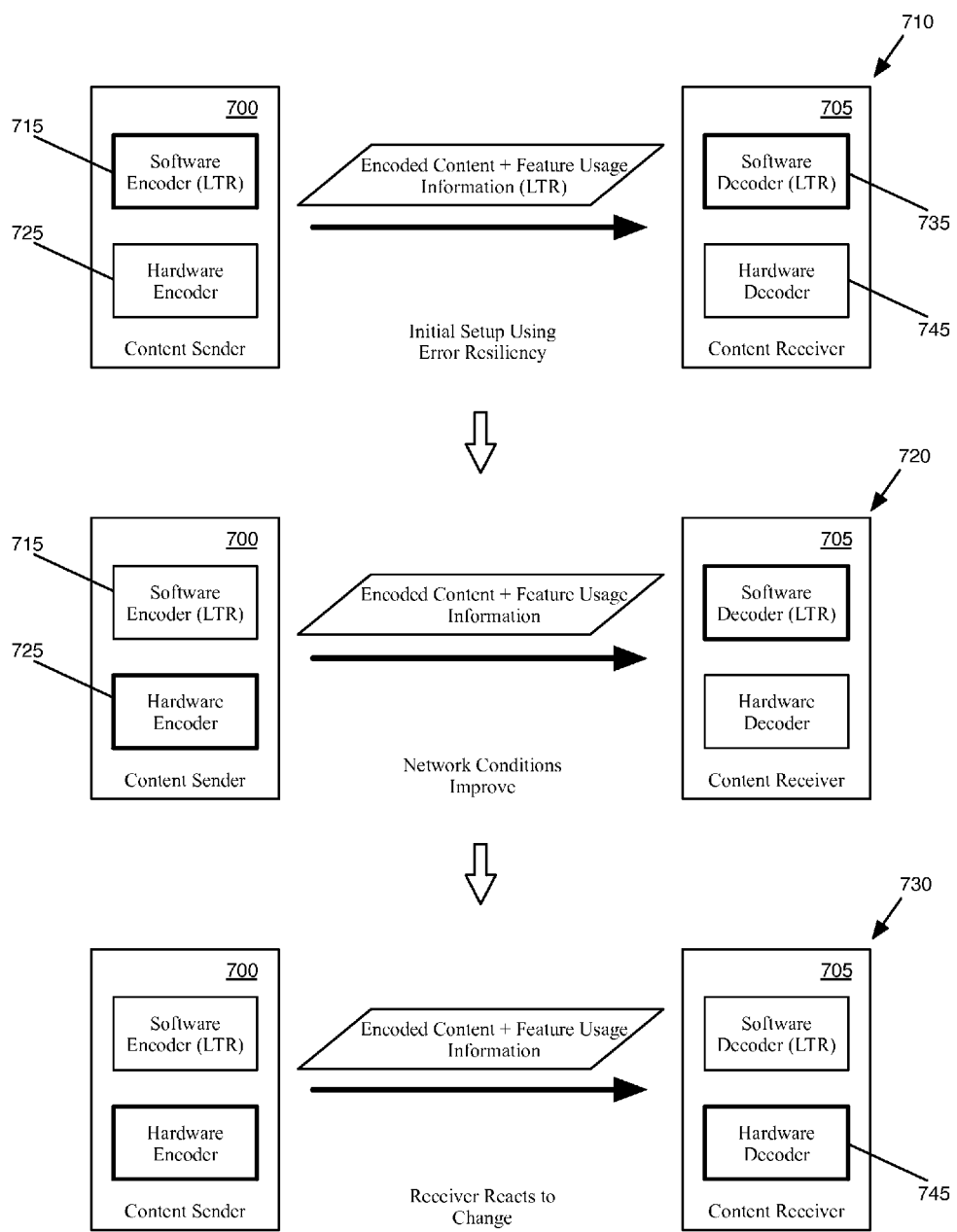
FIG. 7 illustrates a content sending device and content receiving device over three stages in which the network conditions change, thereby resulting in the sending device changing encoders.

As mentioned above, some embodiments use a combination of various different factors to select an encoder for a videoconference or other content communications session. FIG. 6 conceptually illustrates a process 600 of some embodiments for selecting an encoder. The process 600 will be described in part by reference to FIG. 7, which illustrates a content sending device 700 and receiving device 705. The content sending device 700 has a software encoder 715 with the LTR feature and a hardware encoder 725 without the LTR feature, while the content receiving device 705 has a software decoder 735 with the LTR feature and a hardware decoder 745 without the LTR feature. FIG. 7 illustrates these devices over three stages 710-730, in which the network conditions change, thereby resulting in the sending device changing encoders.

As shown, the process 600 begins by identifying (at 605) the current network conditions between the sending device and the receiving device. In some embodiments, the network conditions analyzed include the packet loss rate, latency (delay) time, and data transfer rate (bandwidth). Some embodiments use features such as bandwidth probing to more accurately gauge some of the network conditions. In some cases, the network conditions may not be available at the time the devices are setting up the videoconference, because the devices may require information gathered during the videoconference to accurately identify the network conditions. For instance, until the devices are sending video back and forth, it may be difficult to identify the packet loss rate or data transfer rate. As such, some embodiments will assume a baseline of less than ideal network conditions, in which packets are dropped on a regular basis.

The process also identifies (at 610) features of the different possible encoders. As described above, in some embodiments the device stores this information for easy retrieval. For example, the videoconference might be performed by a videoconferencing application, and at time of startup the application identifies all of the encoders and their features (e.g., by querying the encoders), then stores this information in memory (e.g., RAM). Other embodiments store the information in permanent memory (e.g., in a data file), or query the different encoders when starting a videoconference.

Based on the network conditions, the process determines (at 615) the quality of decoded video at the receiving device. In some embodiments, the video quality is related to the rate of dropped packets (the more packets dropped, the lower the video quality) and the available data rate (a higher data rate means the bit rate for the video can be higher, and thus the video quality will be better). Some embodiments determine what the video quality will be assuming no features are used, then use the features to compensate for problems (e.g., dropped packets). Other embodiments identify video quality for different possible combinations of features (restricted based on the capabilities of the decoders).

The process also identifies (at 620) the current resource usage of the device. That is, the process determines the extent to which other applications operating on the device (e.g., video games, word processing applications, media-editing applications, etc.) are utilizing the device's resources. These resources may include processor usage (i.e., the percentage of processor resources currently in use, the number of threads and processes being performed), network activity (i.e., the percentage of network capability being used by other applications, such as streaming video or audio), and memory usage (i.e., the percentage and amount of available RAM and/or virtual memory).

In addition, the process determines (at 625) the expected power consumption for each possible encoder. In general, the power consumption will vary between software and hardware encoders. Hardware encoders are specific pieces of hardware (e.g., ASICs, FPGAs, etc.) designed to perform only encoding (and decoding), and thus do not require a lot of power (or computing resources). On the other hand, software encoders require the CPU to perform encoding operations, which are often very taxing to the CPU as the CPU is not designed to perform such operations. Thus, using the software encoder will typically result in higher power consumption.

With the various factors identified, the process 600 selects (at 630) an encoder based on the network conditions, decoded video quality, available features, resource usage, and power consumption. In many cases, the choice is between a hardware encoder and a software encoder. The software encoder will often support more features available, including more error-resilient features (e.g., the LTR feature). As such, when network conditions are bad, the sending device of some embodiments will prefer the software encoder so as to improve video quality to an acceptable level. On the other hand, the hardware encoder will often consume less power and computational resources because it does not require the CPU or substantial amounts of memory. Some embodiments will therefore use the hardware encoder whenever conditions do not require the use of a software encoder.

FIG. 7 conceptually illustrates a common scenario, in which the sending device initially uses the software encoder, then switches to the hardware encoder during the video conference. As shown at stage 710, the sending device 700 has initially selected the software encoder 715 and is encoding video using the long-term reference frame feature. As a result, the receiving device 705 is using the software decoder 735, which has the capability to decode the content encoded using the error-resilient LTR feature. At this stage, the network conditions are unknown, and thus the sending device uses the LTR feature as a precaution.

At stage 720, the network conditions have improved, thereby reducing the need for the LTR feature. As a result, the primary factor for using the software encoder has been removed, and thus the device has switched to using the hardware encoder 725 for its resource and power efficiency. As such, the sending device continues transmitting encoded content, but the accompanying feature usage information now indicates that the LTR feature is not in use. As a result, at stage 730 the content receiver reacts by switching to the hardware decoder 745, which some embodiments prefer for similar reasons as the hardware encoder. The decoder selection will be described in further detail in subsection B below. In addition, the mid-conference switching of encoders will be described in further detail in Section II below.

Figure 8:
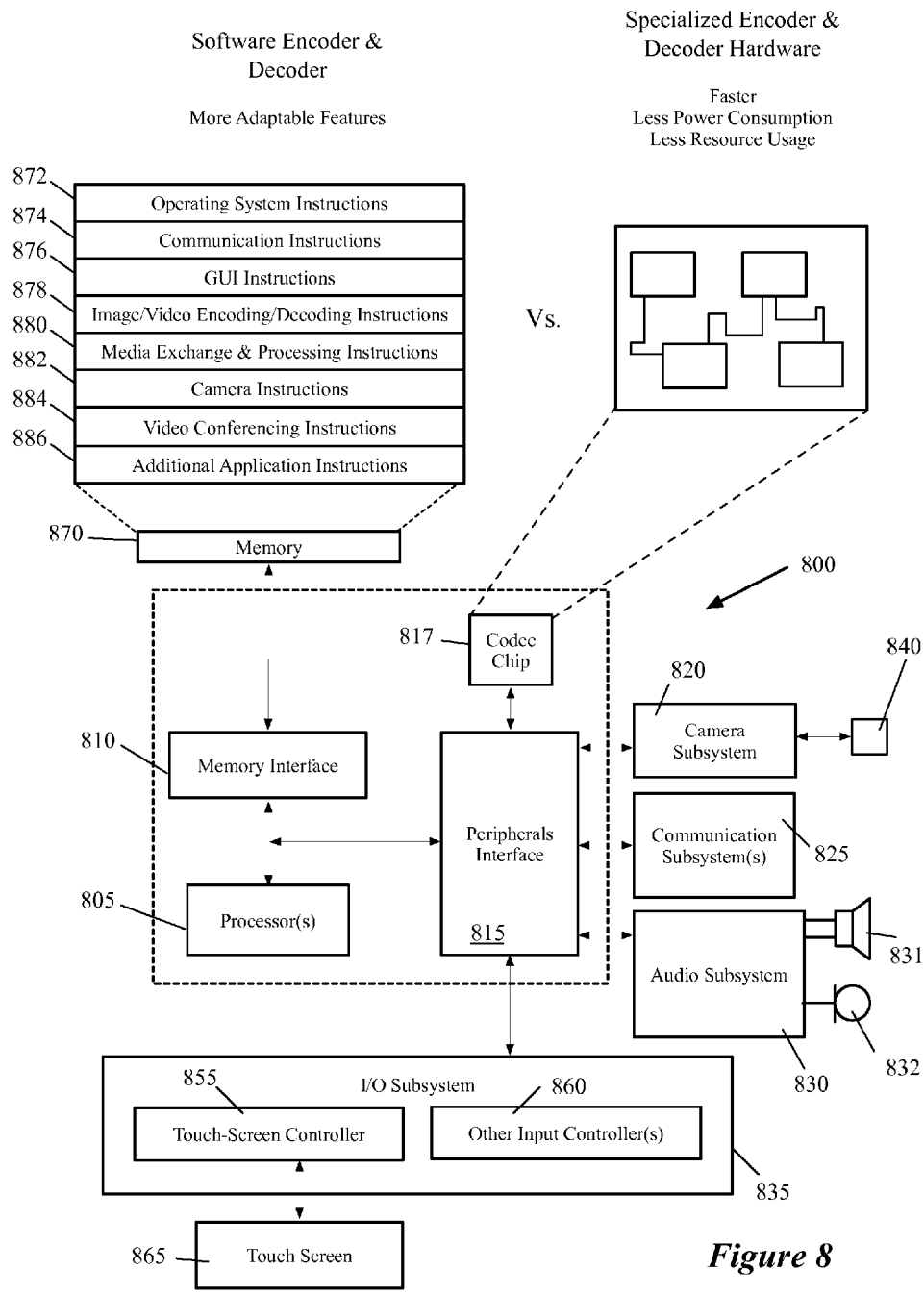
FIG. 8 is an example of a computing device (e.g., a desktop computer, laptop computer, tablet computer, smart phone, PDA, etc.) that participates in a videoconference.

FIG. 8 conceptually illustrates the differences between a hardware encoder (and decoder) and software encoder (and decoder). Specifically, FIG. 8 is an example of a computing device 800 (e.g., a desktop computer, laptop computer, tablet computer, smart phone, PDA, etc.) that participates in a videoconference. The implementation of such a computing device can include one or more processing units 805, a memory interface 810, a peripherals interface 815, and a codec chip 817. Each of the components 805, 810, and 815 that make up the computing device can be separate components or integrated in one or more integrated circuits. The codec chip 817 is a piece of hardware specifically designed for performing encoding and decoding operations, and may be an application-specific integrated circuit (ASIC), a field-programmable gate array (FPGA), or other type of chip. These various components can also be coupled together by one or more communication buses or signal lines.

The peripherals interface 815 can be coupled to various sensors and subsystems, including a camera subsystem 820, a communication subsystem(s) 825 (which may include wired and/or wireless communications subsystems, depending on the device), audio subsystem 830, I/O subsystem 835, etc. The peripherals interface 815 enables communication between processors and peripherals, as well as the codec chip 817 in some embodiments, though some embodiments directly connect from the memory to the codec chip 817 through the memory interface 810.

The camera subsystem 820 can be coupled to one or more optical sensors 840 (e.g., a charged coupled device (CCD) optical sensor or a complementary metal-oxide-semiconductor (CMOS) optical sensor). The camera subsystem 820 coupled with the sensors may facilitate camera functions, such as image and/or video data capturing. The camera subsystem 820 can be used to generate video data for an audio/video conference (e.g., as shown in FIGS. 3 and 4).

The communication subsystems 825 may serve to facilitate communication functions. The communication subsystems 825 may include one or more transceivers (with each transceiver including a receiver and transmitter), such as one or more radio or optical transceivers, Ethernet transceivers, etc. For instance, in some embodiments, the communication subsystems 825 include wireless communications subsystems with a cellular radio transceiver (e.g., 3G or 4G transceiver), a Bluetooth transceiver, and a Wi-Fi transceiver, and wired communications subsystems with an Ethernet transceiver. Through their data channel circuits that utilize standard data protocols (such as IP layer protocols), such transceivers allow the mobile device to connect to different communication networks and different computing devices. In some embodiments, the different transceivers share hardware resources on the mobile device. For instance, two or more of the transceivers are fully or partially implemented by one or more processing units of the processor 805 in some embodiments.

The audio subsystems 830 are coupled to a speaker and a microphone to facilitate voice-enabled functions, such as voice recognition, digital recording, etc. The I/O subsystem 835 involves the transfer between input/output peripheral devices, such as a display, a touch screen, etc., and the data bus of the CPU through the peripherals interface. I/O subsystem 835 can include a touch-screen controller 855 and other input controllers 860 to facilitate these functions. Touch-screen controller 855 can be coupled to the touch screen 865 and detect contact and movement on the screen using any of multiple touch sensitivity technologies. Other input controllers 860 can be coupled to other input/control devices, such as a mouse, keyboard, buttons, etc.

Memory interface 810 is coupled to memory 870, which can include high-speed random access memory and/or non-volatile memory such as flash memory. Memory can store an operating system (OS) 872. The OS 872 can include instructions for handling basic system services and for performing hardware dependent tasks.

Memory can also include communication instructions 874 to facilitate communicating with one or more additional devices; graphical user interface instructions 876 to facilitate graphic user interface processing; image/video encoding/decoding instructions 878 to facilitate encode and decode processing and functions (e.g., instantiations of a software encoder and decoder instructions for performance by the processor 805 during a videoconference, as well as intermediate encoding and decoding results stored in random access memory); media exchange and processing instructions 880 to facilitate media communication and processing-related processes and functions; camera instructions 882 to facilitate camera-related processes and functions; video conferencing instructions 884 to facilitate video conferencing processes and functions; and additional application instructions 886 to facilitate additional applications running on the device 800 (e.g., word processing, video games, media players, etc.). The above identified instructions need not be implemented as separate software programs or modules. Various functions of the computing device 800 can be implemented in hardware and/or in software, including in one or more signal processing and/or application specific integrated circuits.

As shown in the diagram, the memory stores various software instructions along with the software encoder/decoder instructions. These instructions all have to share both the processing resources 805 and the volatile memory resources. On the other hand, the codec chip 817 is designed specifically to perform encoding and decoding operations and does not have to use the processor or memory resources. As a result, the codec chip 817 can perform encoding operations faster than the encoding and decoding instructions stored in memory 870 while using fewer processing/memory resources and consuming less power. On the other hand, the software encoder and decoder often have more supported encoding features than the codec chips 817.

B. Decoder Selection

Figure 9:
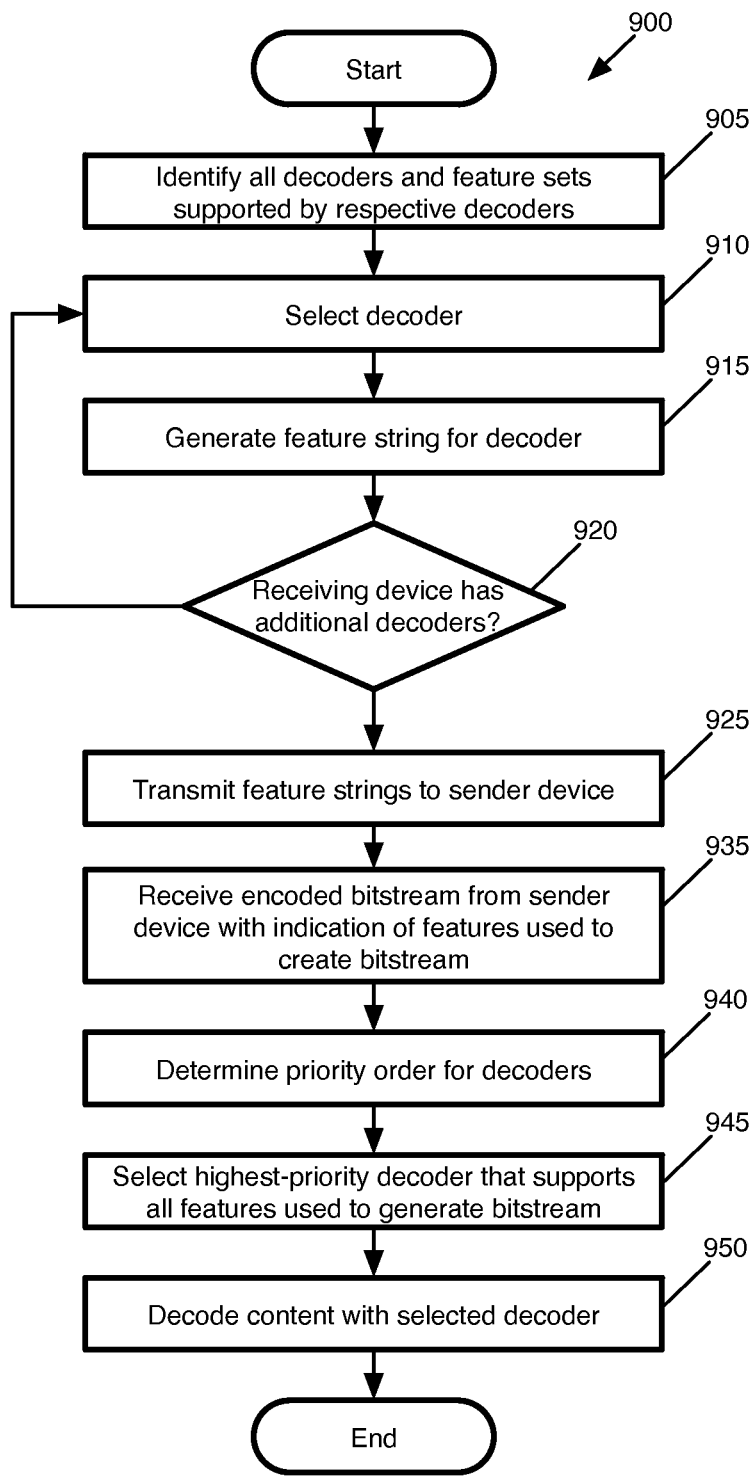
FIG. 9 conceptually illustrates a process of some embodiments for selecting a decoder for a content communications session.
Figure 10:
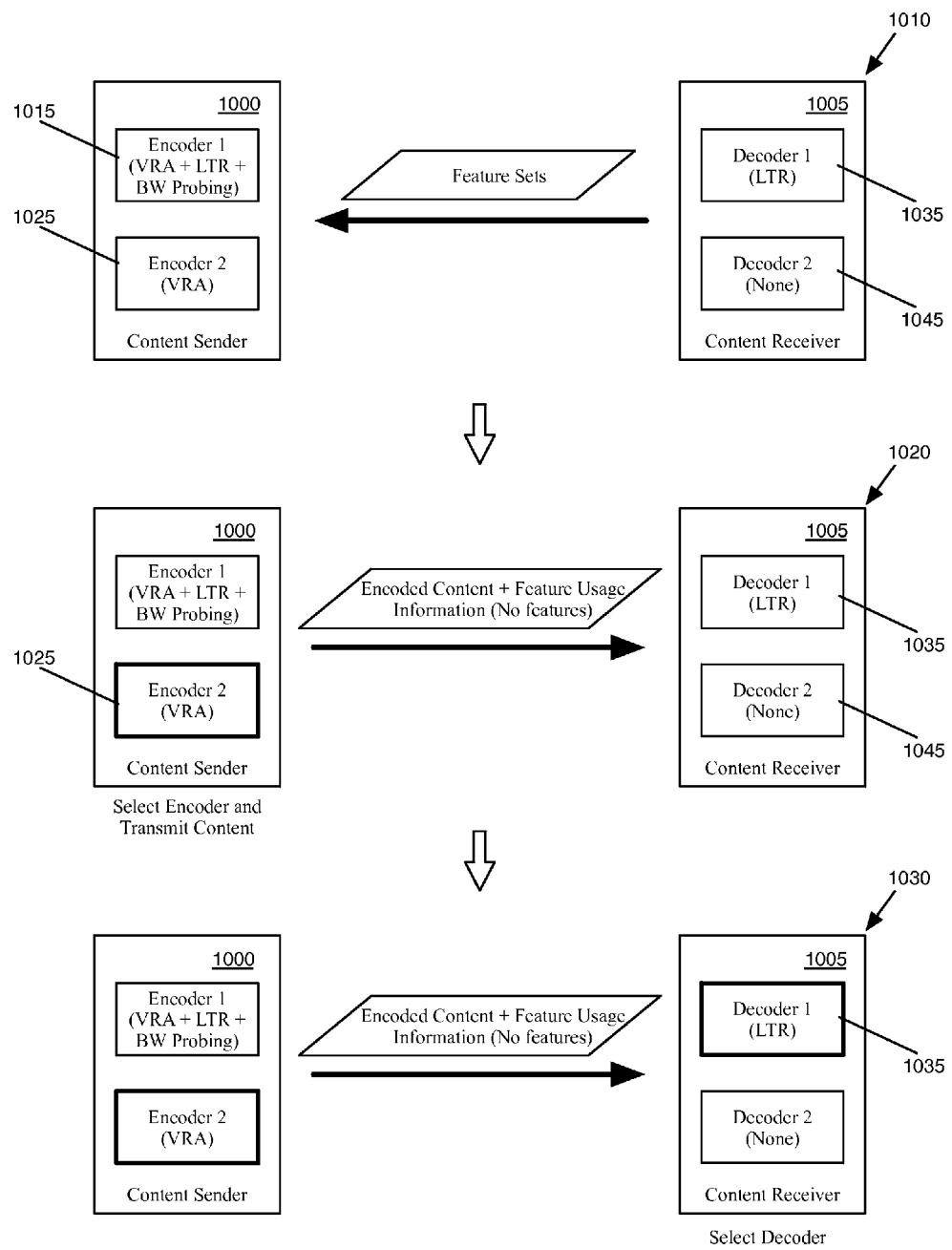
FIGS. 10 and 11 illustrate the setup for a video communications session between a content sending device and a content receiving device.
Figure 11:
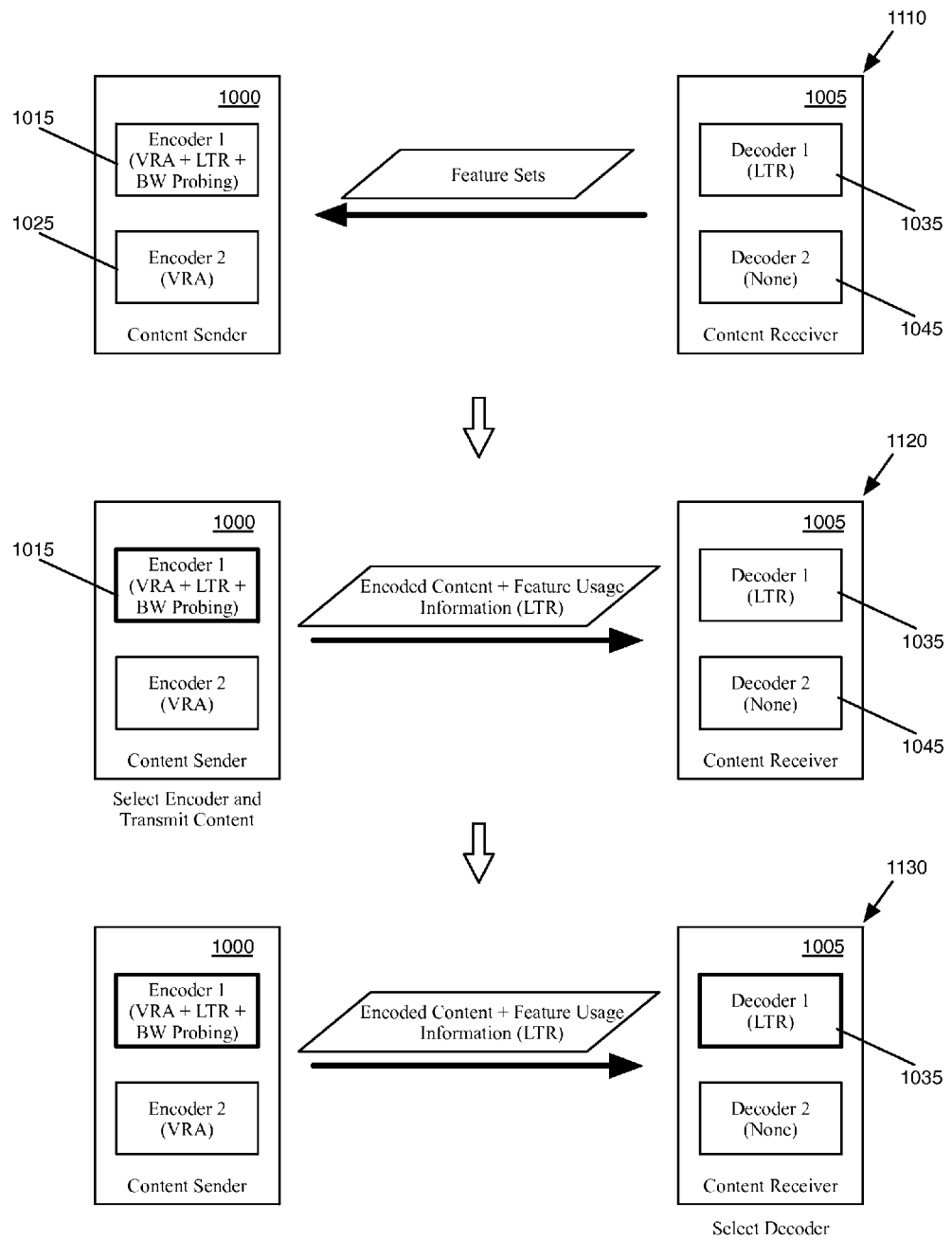

FIG. 9 conceptually illustrates a process 900 of some embodiments for selecting a decoder for a content communications session. The process 900 will be described by reference to FIGS. 10 and 11, which illustrate the setup for a video communications session between a content sending device 1000 and a content receiving device 1005, as well as FIG. 12, which illustrates a more detailed software architecture of such a content receiving device. Each of FIGS. 10 and 11 illustrates the setup over three stages, similar to FIGS. 3 and 4 above.

Figure 12:
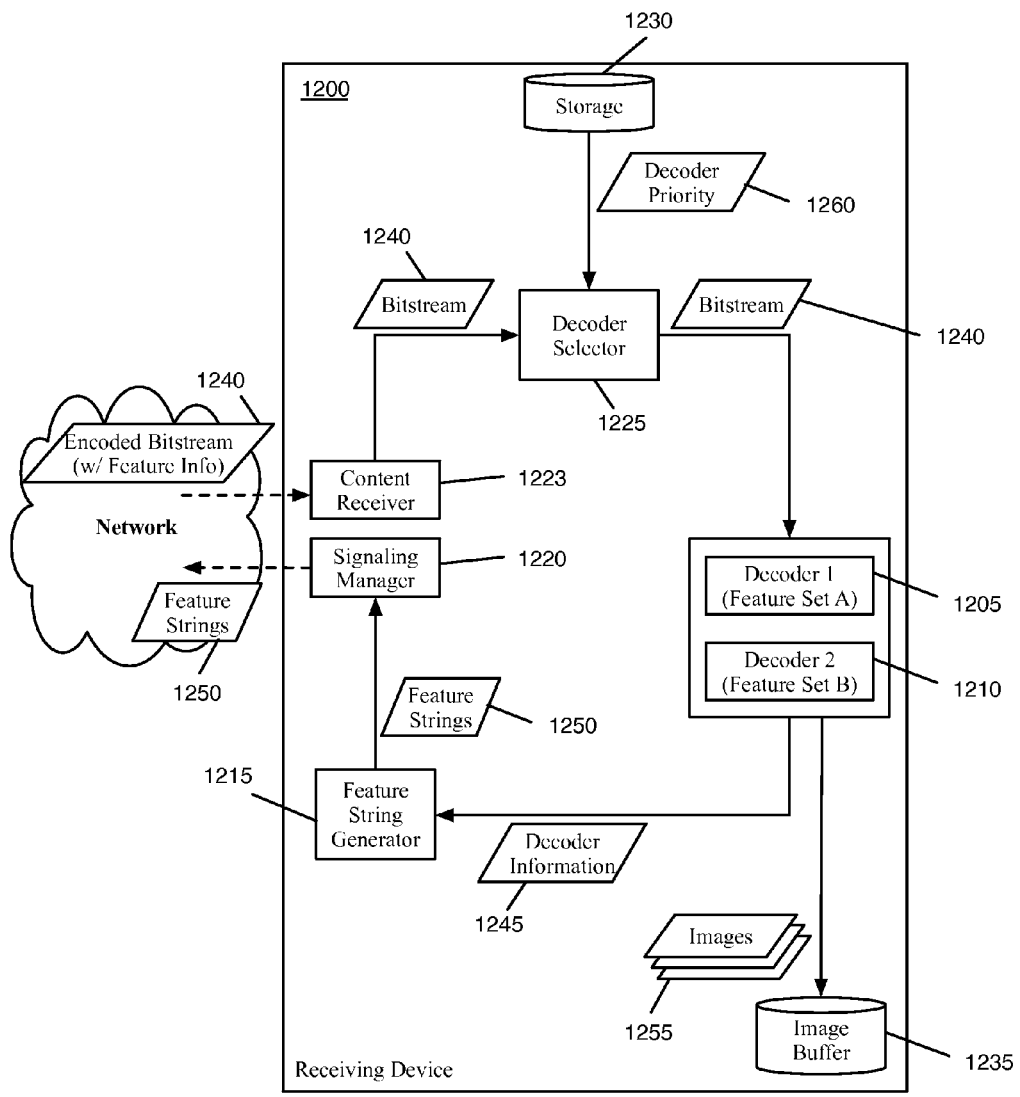
FIG. 12 conceptually illustrates the software architecture of a content receiving device of some embodiments.

FIG. 12, as mentioned, conceptually illustrates the software architecture of a content receiving device 1200 of some embodiments. Specifically, the receiving device 1200 receives and decodes video for a videoconference. The receiving device 1200 includes a first decoder 1205, a second decoder 1210, a feature string generator 1215, a signaling manager 1220, a content receiver 1223, a decoder selector 1225, a storage 1230, and an image buffer 1235.

The decoders 1205 and 1210 are each capable of decoding images received in a bitstream 1240 from a sending device as part of a videoconference. The decoders may be software decoders, hardware decoders, or both. In some embodiments, both decoders are for decoding images that are encoded in the same format (e.g., H.264), but support different features that may optionally be used in encoding the images by the sending device. In this case, the first decoder 1205 supports feature set A while the second decoder 1210 supports feature set B. Some of these features were described in detail above in subsection A.

The feature string generator 1215 retrieves decoder information 1245 from the decoders 1205 and 1210, and generates feature strings for the decoders. In some embodiments, the feature strings are succinct encapsulations of the features supported by the decoders. The feature strings may be text strings or may use a coded form. Some embodiments actually retrieve this information from memory rather than from the decoders in order to generate the feature strings.

The feature string generator 1215 passes the feature strings 1250 to the signaling manager 1220. The signaling manager 1220 handles the call signaling for the video conference. This involves setting up the videoconference (e.g., setting up network connections between the receiving device 1200 and one or more sending devices). In addition, in some embodiments, the signaling manager 1220 transmits its decoder features strings 1250 during call signaling. The signaling manager may transmit each decoder's features as a separate string, or append the strings together as a single feature string.

The content receiver 1223 receives an encoded bitstream 1240 from one or more sending devices (e.g., sending device 500 of FIG. 5). The content receiver passes this bitstream 1240 to the decoder selector 1225. The decoder selector analyzes the bitstream 1240 to determine which of the decoders 1205 and 1210 should decode the bitstream, then sends the bitstream to the selected decoder for decoding. To make the decoder selection, the decoder selector 1225 retrieves a decoder priority list 1260 from the storage 1230 (e.g., volatile memory such as RAM). The decoder priority list indicates the preference order of the different decoders available to the receiving device 1200 (in this case, the decoders 1205 and 1210). In some embodiments, hardware decoders are preferred over software decoders for the reasons given in the discussion of FIG. 8. The decoder selector 1225 of some embodiments analyzes the features used to encode the bitstream and identifies the highest priority decoder that is capable of decoding the bitstream (i.e., that supports all of the features used to encode the bitstream).

The selected decoder receives the bitstream from the decoder selector 1225 (or, in some embodiments, directly from the content receiver—the decoder selector may indicate to the content receiver to which decoder it should forward the bitstream). Upon receiving the bitstream, the decoder decodes the information to produce displayable images (e.g., a set of ordered pixel values). The images 1255 are sent to an image buffer 1235, from which the images can be displayed on a display device at the receiving device 1200 (e.g., part of the receiving device or connected to the receiving device).

The operation of FIG. 12 will be described by reference to the process 900. As with the process 200, the process 900 begins in some embodiments when two devices decide to begin a content communications session, such as a videoconference. In some embodiments, the process 900 is performed by a device that will act as a receiver of video during the videoconference. In some cases, both devices will perform process 900 or a similar decoder selection process.

In some embodiments, the process 900 starts during a call signaling phase of a videoconference. The call signaling phase is used by the devices in the conference to establish any necessary connections (e.g., directly between the devices, between the devices and intermediary network elements, etc.) and negotiate terms of the videoconference (e.g., video and audio encoding formats, etc.).

As shown, the process begins by identifying (at 905) all decoders and the feature sets supported by the respective decoders. That is, for each decoder available to the receiving device, the set of features that the decoder supports is identified. In some embodiments, the device stores this information for easy retrieval. For example, the videoconference might be performed by a videoconferencing application, and at time of startup the application identifies all of the decoders and their features (e.g., by querying the decoders), then stores this information in memory (e.g., RAM). Other embodiments store the information in permanent memory (e.g., in a data file), or query the different decoders when starting a videoconference.

In the case of FIGS. 10 and 11, the content receiver 1005 has a first available decoder that supports long-term reference frames (LTR) and a second available decoder that does not support any of the shown features. The LTR feature, along with additional features such as video resolution adaptation (VRA), bandwidth (BW) probing, etc., was described in subsection A. As mentioned above, in some embodiments the features that are exchanged in the feature sets are modifications to the way a video image is encoded in a particular encoding format (e.g., H.264), and thus correspond to modifications to the way the image will be decoded. That is, the same encoder using the H.264 encoding format will encode an image differently when a particular feature is used than when the particular feature is not used.

With the decoders and their features identified, the process 900 can begin generating feature strings for the various decoders. In some embodiments, this feature string generation is performed by a module such as the feature string generator 1215. The process selects (at 910) a decoder. Some embodiments select the decoders in a particular order (e.g., hardware decoders first, software decoders first, etc.), while other embodiments generate the feature strings in a random order. In some embodiments, the process does not perform operations 905-920 during call signaling, but instead the application generates feature strings for all available decoders (and encoders, in some cases) when it is started up (e.g., when a user selects to open a video conferencing application, when the device on which the application runs is booted up, etc.).

In the illustrated process 900, however, the process generates (at 915) a feature string for the selected decoder. In some embodiments, the feature string is a succinct encapsulation of the features supported by the decoder. The feature string may be a text string or may use a coded form. For instance, assuming a finite set of 256 or fewer possible features, each feature could be encoded using a single byte. In addition to identifying the features available, some embodiments specify how an encoder at the sending device should indicate whether it used each particular decoder feature. Some embodiments, for example, specify a bit position for each feature that the encoder sets to either 0 or 1 to indicate whether the feature was used to encode a particular image. This set of bits is then appended to the bitstream for the image by the encoder. The feature strings of some embodiments are described in further detail below in Section III.

The process then determines (at 920) whether the sending device has additional decoders for which it needs to generate feature strings. When additional decoders remain, the process returns to 910 to select the next decoder and generate a feature string for the newly selected decoder. Once feature strings have been generated for all decoders available to the video-conferencing application, the process transmits (at 925) the feature strings for all of its available decoders to a sender device. Some embodiments append all of the feature strings together as a single string, with notation marking the beginning of each particular encoder's features in the string. In other embodiments, each encoder's feature set is sent as a separate piece of data. As shown in FIG. 12, in some embodiments a signaling manager (e.g., manager 1220) performs the transmission (and appending) of the feature strings.

The first stage 1010 of FIG. 10 illustrates that the receiving device 1005 transmits its decoder feature sets to the sending device 1000. That is, the receiving device 1005 transmits a first feature string indicating the presence of a decoder 1035 with the LTR feature and a second feature string indicating the presence of a decoder 1045 with no supported features (though the decoder is still capable of decoding a bitstream generated by the appropriate encoder, so long as the LTR, VRA, and BW probing features are not used). The first stage 1110 of FIG. 11 illustrates the same exchange of features between the devices 1000 and 1005.

The illustrated examples in FIGS. 10 and 11 assume only one sending device 1000, but in some embodiments there may be more than two devices participating in the videoconference. In such situations, some embodiments transmit the decoder feature strings to all sending devices. This enables each device sending video to the receiving device to ensure that it encodes a bitstream that the receiving device can decode properly.

As mentioned above, in some embodiments the transmission of feature sets (i.e., operation 925) is part of the call signaling process of the videoconferencing application of some embodiments. In some embodiments, each device acts as both a sender and receiver, and thus both sends its decoder features to and receives the decoder features from the other device. In some embodiments, the device initiating the video conference transmits its decoder feature strings first, then the other, non-initiator devices transmit their decoder feature strings back to the initiating device (and possibly to each other, depending on the architecture used for the video conference).

After sending the decoder feature strings, the process 900 receives (at 935) an encoded bitstream from the sending device along with an indication of features used to generate the bitstream. As described in the above subsection, the sending device of some embodiments selects an encoder and uses the feature strings received from the receiving device to identify a set of encoding features of the selected encoder to use in generating the bitstream. The sending device then transmits information to the receiving device indicating the features used to generate the bitstream.

In stage 1020 of FIG. 10, the sending device 1000 selects the encoder 1025, which only supports the VRA feature. As described above, this decision might be due to network conditions or operating conditions (e.g., resource and power usage) known to the device 1000, because the LTR and BW probing features are not necessary given these conditions, etc. Because neither decoder 1035 nor decoder 1045 supports the VRA feature, this feature is not actually used by the encoder 1025 to generate the encoded bitstream sent to the receiving device 1005. In stage 1120 of FIG. 11, the sending device 1000 selects the encoder 1015, that supports the VRA, LTR, and BW probing features. In this case, one of the decoders available to content receiver 1005 supports the LTR feature, so this feature is available for use by the encoder 1015. As shown, the encoder 1015 uses the LTR feature, perhaps because a likelihood of dropped data packets exists for the connection between devices 1000 and 1005.

Returning to FIG. 9, the process 900 determines (at 940) a priority order for the decoders available to the receiving device. In some embodiments, this priority order is determined irrespective of the features used to generate the bitstream and the features supported by each decoder. In fact, some embodiments determine the priority order during call signaling (i.e., before the encoded bitstream is received) and store this information in memory (e.g., storage 1230) for later use. In some embodiments, the local priority for the decoders is based on the power consumption of the different decoders and/or the current resource usage at the device.

Much like with the software and hardware encoder described above, a hardware decoder will often use less power and fewer processing/memory resources than a software decoder, because the software decoder requires the use of the device's central processing units and RAM. On the other hand, the software decoder (like the software encoder) will often support fewer features. As such, some embodiments will always prefer to user a hardware decoder over a software decoder unless required to use the software decoder. However, some embodiments may anticipate the use of additional features not supported by the hardware decoder during the videoconference and therefore prioritize the software decoder over the hardware decoder unless the device resources are heavily taxed.

The process 900 next selects (at 945) the highest-priority decoder that supports all features used to generate the received bitstream. In some cases, there will only be one possible decoder, though in other cases the device will have to use the priority list to select from among multiple possible decoders (e.g., if no features are in use). FIG. 12 illustrates that the decoder selector 1225 analyzes the bitstream and the decoder priority, then forwards the bitstream to the selected decoder.

The third stage 1030 of FIG. 10 illustrates the case in which no features are used in creating the bitstream, and thus either of the decoders 1035 and 1045 are possibilities for the receiving device 1005. In this case, the receiving device 1005 selects the decoder 1035, even though it's LTR feature is not currently needed. The device 1005 might select this decoder because the LTR feature is expected to be used later in the conference (e.g., because the network conditions are not ideal) or because the decoder 1035 uses less power or is a faster decoder. In the third stage 1130 of FIG. 11, the LTR feature is used to generate the bitstream, and thus the only decoder that can decode the bitstream correctly is the decoder 1035. As such, the receiving device selects this decoder.

With the decoder selected, the process 900 begins decoding (at 950) the encoded bitstream received from the sending device, then ends. One of ordinary skill in the art will recognize that, as with the encoding/transmission process described above, the decoding process of some embodiments will continue for the duration of the videoconference. The receiving device will continuously receive (in the sense of receiving discrete data packets with minimal interruption) the encoded video bitstream and decode the bitstream to generate displayable video images.

C. Additional Examples

Figure 13:
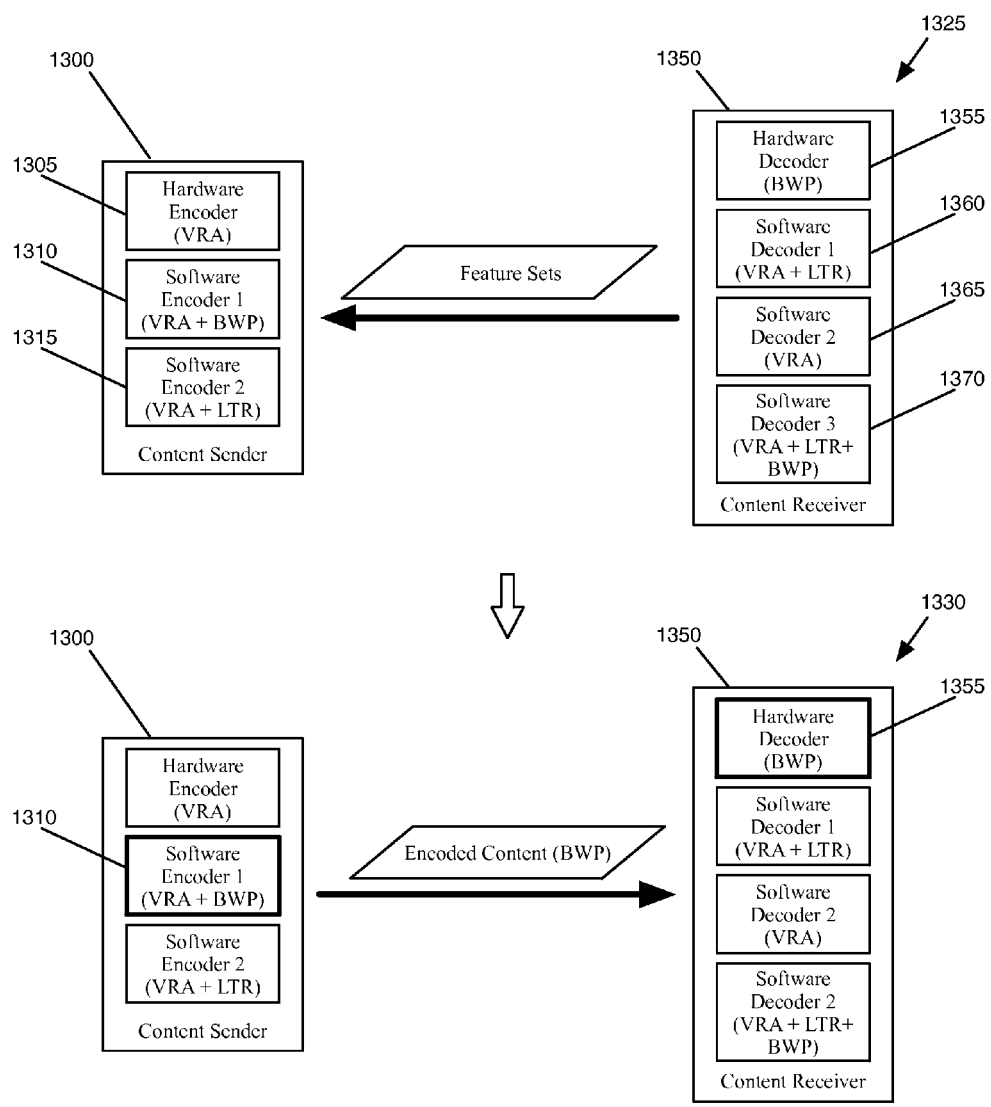
FIG. 13 illustrates a situation in which the sending device has three available decoders and the receiving device has four available decoders.

The examples illustrated in FIGS. 3, 4, 10, and 11 show cases in which a single content sending device having two encoders participates in a videoconference with a single content receiving device having two decoders. FIG. 13 illustrates a situation in which the sending device has three available decoders and the receiving device has four available decoders. Specifically, this figure illustrates a content sending device 1300 with a hardware encoder 1305, a first software encoder 1310, and a second software encoder 1315. The hardware encoder 1305 supports the VRA and LTR features, the first software encoder 1310 supports the VRA and BW probing features, and the second software encoder 1315 supports the LTR feature. In addition, the figure illustrates a content receiving device 1350 with a hardware decoder 1355, a first software decoder 1360, a second software decoder 1365, and a third software decoder 1370. The hardware decoder 1355 supports the VRA feature, the first software decoder 1360 supports the VRA and LTR features, the second software decoder 1365 supports the BW probing feature, and the third software decoder 1370 supports the VRA, LTR, and BW probing features.

While the devices illustrated in this figure have a specific number of encoders and decoders, one of ordinary skill in the art will recognize that in some embodiments the devices can have any number of decoders or encoders. In some devices, the number may fluctuate in case other applications on the device are using one or more of the encoders or decoders (e.g., if the user of the device is also watching streaming video, the application playing the video may utilize one of the decoders).

As shown, at the first stage 1325 of FIG. 13, the content receiving device 1350 transmits feature strings describing the features supported by its four decoders to the content sending device. At the second stage 1330, the devices have selected their encoders and decoders for the videoconference. The sending device 1300 selects its first software encoder 1310 and is using the bandwidth probing feature. This gives the content receiving device 1350 the choice of the hardware decoder 1355 and the third software decoder 1370. In this situation (perhaps because a processor-intensive application is also operating on the device), the receiving device 1350 selects the hardware decoder 1355, and decodes video images for viewing using this decoder.

Figure 14:
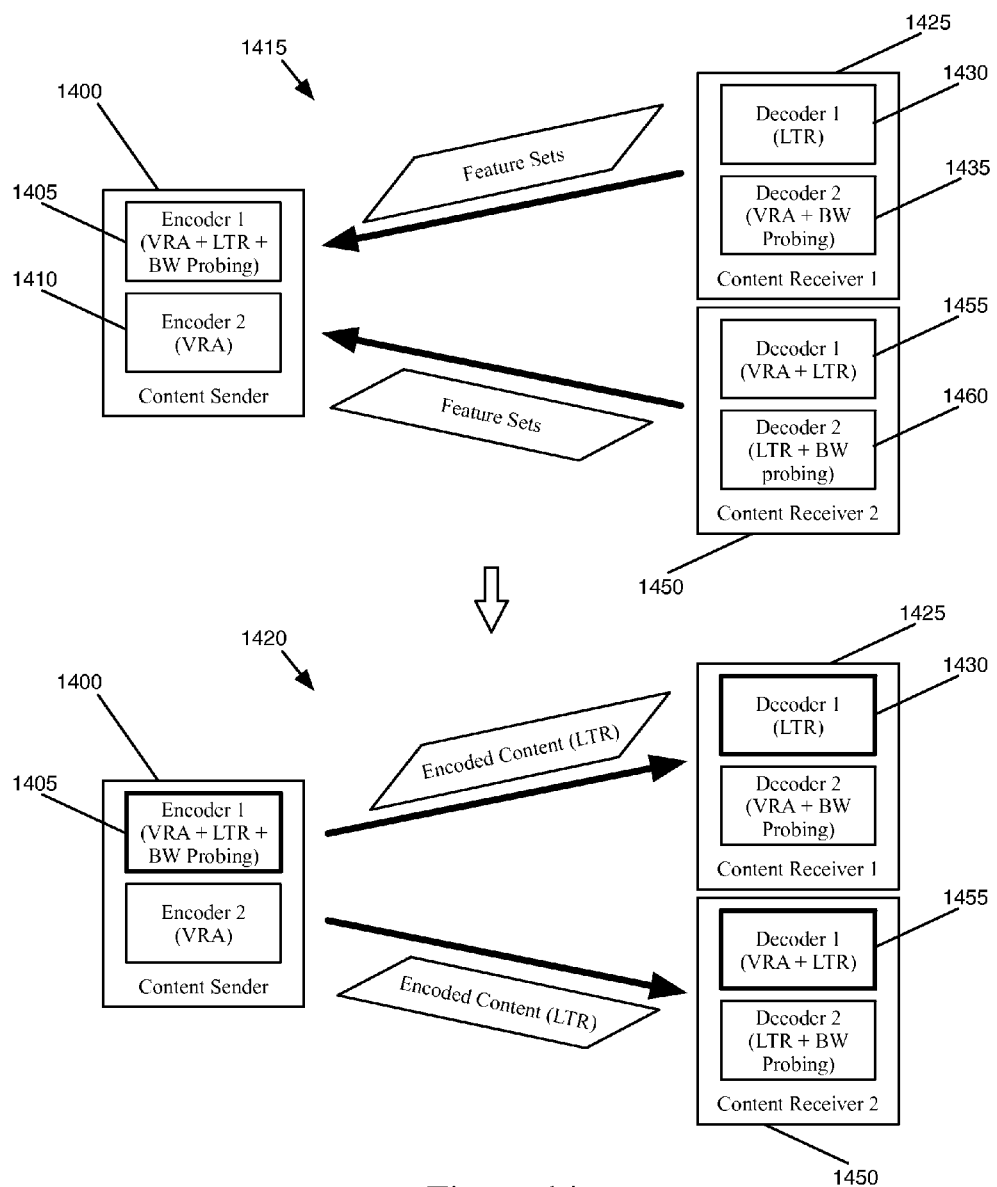
FIG. 14 illustrates the setup for a videoconference in which a single device is transmitting encoded video to multiple devices.

FIG. 14 illustrates the setup for a videoconference in which a single device is transmitting encoded video to multiple devices. These devices might set up the videoconference in a star network arrangement in which one device acts as a central distributor for the conference. The central distributor device of some embodiments receives video from each device in the conference, decodes this video, then sends out composite encoded video that includes its own captured video as well as that of the other devices. In other embodiments, the multiple devices each exchange video with all other devices participating in the conference (either directly or indirectly through another device).

In the illustrated example, a sending device 1400 will encode video and send the encoded video to both the receiving device 1425 and the receiving device 1450. The sending device 1400 has available a first encoder 1405 that supports VRA, LTR, and BW probing features and a second encoder 1410 that supports the VRA feature. The first receiving device 1425 has a first decoder 1430 that supports the LTR feature and a second decoder 1435 that supports the VRA and BW probing features. The second receiving device 1450 has a first decoder 1455 that supports the VRA and LTR features and a second decoder 1460 that supports the LTR and BW probing features.

As shown, in the first stage 1415 of FIG. 14, the sending device 1400 receives feature sets from the first receiving device 1425 and the second receiving device 1450. Each of these content receiving devices send feature strings describing their two decoders to the content sending device.

At the second stage 1420, the devices have selected their encoder and decoders for the videoconference. The sending device 1400 selects the first encoder 1405, which supports all three of the features. However, only certain sets of features can be used due to the constraints imposed by sending to multiple devices. In fact, although the first device has a decoder 1435 that supports the VRA and BW probing features, and the second device has a first decoder 1455 that supports the VRA and LTR features and a second decoder 1460 that supports the LTR and BW probing features, none of these pairs can be used by the encoder 1405 in some embodiments. This constraint is because the first receiving device 1425 cannot decode a bitstream encoded with either of the latter two pairs of features and the second receiving device cannot decode a bitstream encoded with the first pair of features. Thus, the encoder 1405 may use any of the three features on its own, but may not combine it with any of the other features. Thus, the sending device chooses which feature is most important given the current conditions, and uses this feature. In the illustrated case, the selected feature is the long-term reference frame feature, possibly because of a concern for dropped packets.

The first receiving device 1425 only has one decoder 1430 that supports the LTR feature, so this decoder is used. Both decoders available to the second receiving device 1450 support the LTR feature, so the device is forced to make a choice and use the highest-priority decoder. In this case, the decoder 1455 is such a decoder. This might be the higher priority decoder because of the current operating conditions (e.g., a hardware vs. a software decoder) or because the sending device 1400 is more likely to switch to using the VRA feature than the BW probing feature during the videoconference.

II. Modifying Selection of Encoder and Decoder

As mentioned above, one or more of the devices participating in the videoconference may modify the selection of its encoder and/or encoding features used to generate the bitstream for transmission or its decoder used for decoding the received bitstream. For example, the network conditions might change, leading to a need to use a particular feature (or removing a need to use a different feature). The resources of a device might free up, making it less onerous to use a software encoder or decoder (or, the resources might become more taxed, mandating a switch to a hardware encoder or decoder).

Figure 15:
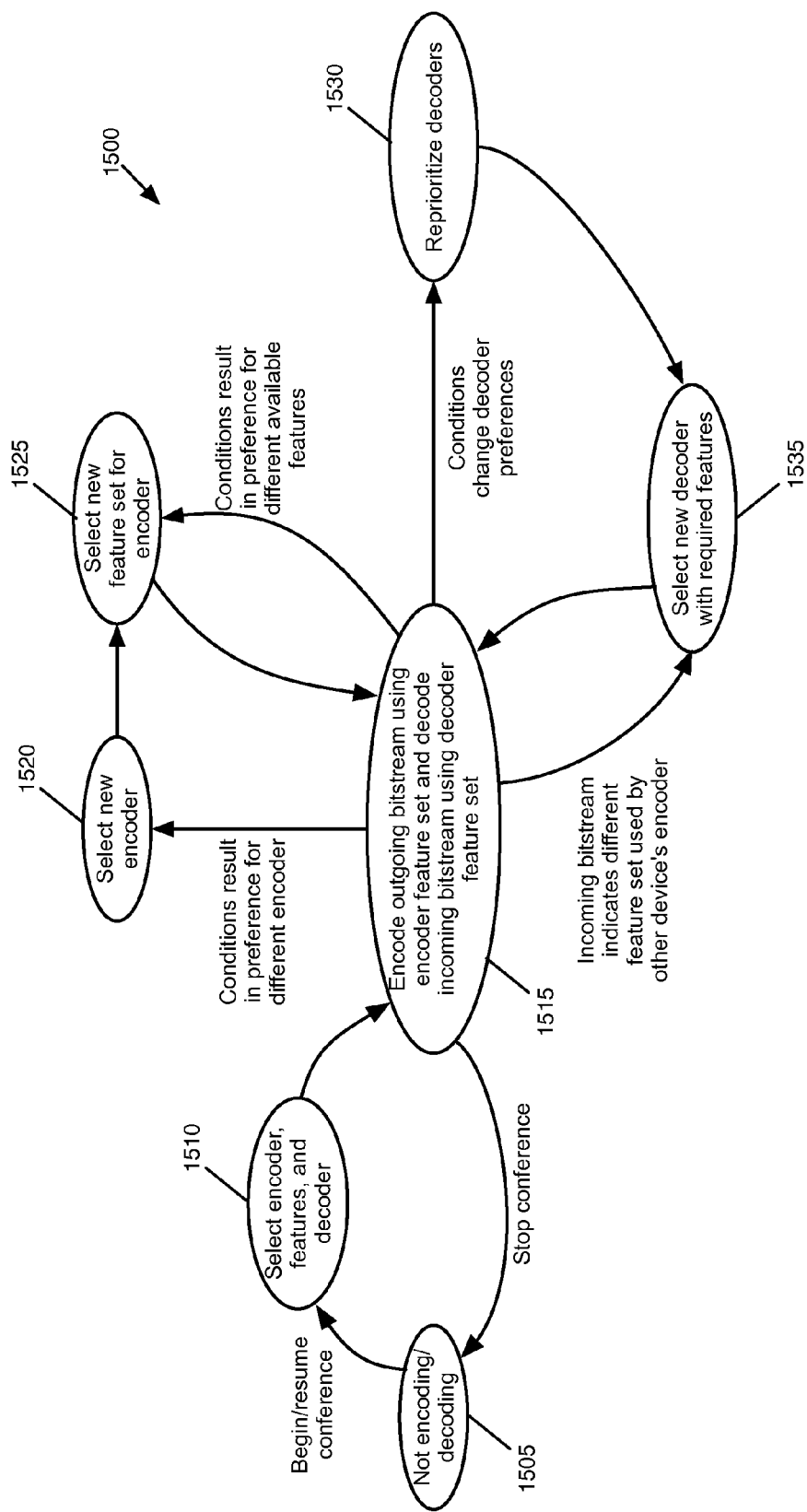
FIG. 15 conceptually illustrates a state diagram for a videoconferencing application of a device participating in a videoconference according to some embodiments.

FIG. 15 conceptually illustrates a state diagram 1500 for a videoconferencing application of a device participating in a videoconference according to some embodiments. One of ordinary skill will recognize that the state diagram 1500 does not describe all states of the videoconferencing application, but instead focuses on the in-conference encoding and decoding. The state diagram 1500 will be described by reference to FIG. 16, which illustrates two devices participating in a videoconference with each other over the course of four stages in which various modifications are made to the encoding and decoding settings.

Figure 16:
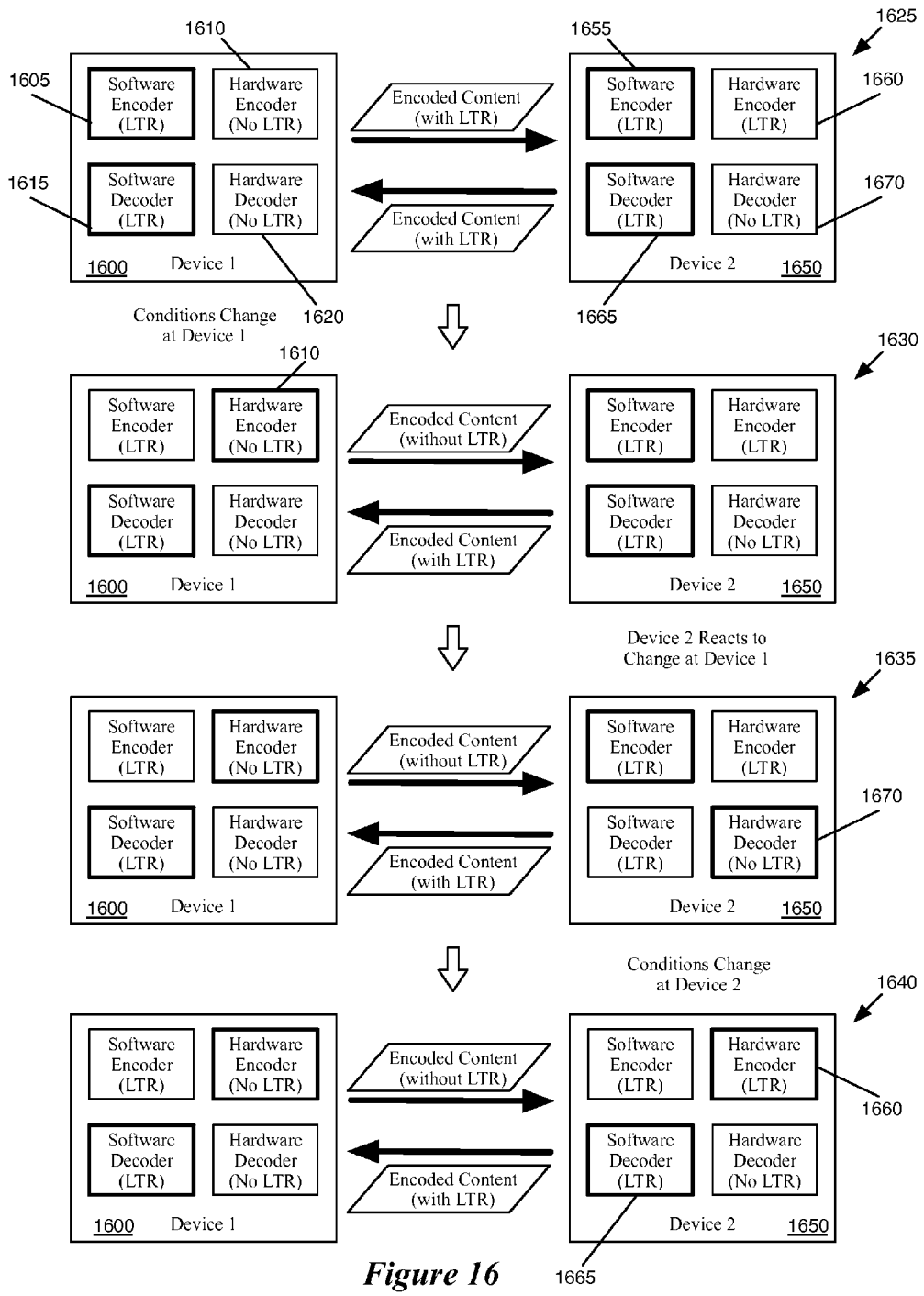
FIG. 16 conceptually illustrates two devices participating in a videoconference with each other over the course of four stages in which various modifications are made to the encoding and decoding settings.

FIG. 16 conceptually illustrates a first device 1600 and a second device 1650. Each device runs a videoconferencing application (not shown) and has two encoders and two decoders available to the videoconferencing application. The first device 1600 has a software encoder 1605 that supports the long-term reference frame (LTR) feature and a hardware encoder 1610 that does not support the LTR feature. The first device 1600 also has a software decoder 1615 that supports the LTR feature and a hardware decoder 1620 that does not support the LTR feature. The second device 1650 has a software encoder 1655 and a hardware encoder 1660, both of which support the LTR feature. The second device 1650 also has a software decoder 1665 that supports the LTR feature and a hardware decoder 1670 that does not support the LTR feature.

As shown in FIG. 15, when the videoconferencing application is not participating in a conference, the application is in a state 1505 in which no encoding or decoding is performed. The application may be performing other processes at this time, such as responding to user interactions (e.g., to find another device to call), displaying video captured at the device, etc.

When the videoconferencing application receives a command to begin (or resume) a conference, the application transitions to state 1510 to select an encoder and decoder to use for the conference. The application may begin a conference in response to a user initiating a call (i.e., video-conference request) to another device, or in response to a user accepting a call from another device. In some embodiments, at this state 1510 the videoconferencing application begins the setup process and performs the processes 200 and 900 or variants thereof to initially select (i) an encoder for encoding video to transmit to the other device in the conference and (ii) a decoder for decoding video received from the other device in the conference. If the conference involves additional devices, then the application will have to consider these additional devices and possibly use multiple decoders or encoders for the conference. The ensuing discussion assumes a videoconference between two devices, however.

With the videoconference set up, and the encoder and decoder selected, the application transitions to state 1515. At state 1515, the application (using the selected encoder and decoder of the device) encodes the outgoing bitstream (of images captured by a camera at the device) using a feature set selected for the encoder and decodes the incoming bitstream using a feature set selected by the other device in the conference. The first stage 1625 of FIG. 16 illustrates that a videoconference has begun between devices 1600 and 1650. The first device 1600 is using its software encoder 1605 to encode video using the LTR feature and transmitting this to the second device 1650, which is using its software decoder 1665 to decode this video. Similarly, the second device 1650 is using its software encoder 1655 to encode video using the LTR feature and transmitting this to the first device 1600, which is using its software decoder 1615 to decode this video. This selection of encoder and decoder may be due to a particular set of conditions existing at the devices or in the network between them at this stage. For example, it may be the case that both devices want to use the LTR feature due to a high probability of dropped packets, and enough resources are free at both devices to use the software encoder. While in many cases the second device 1650 would prefer the hardware encoder 1660 because it also has the LTR feature, that encoder might be in use for another application or might be lacking other features supported by the software encoder 1655. For both devices, the choice of the software decoder is currently mandated by the fact that only the software decoders can decode a bitstream that was encoded with the LTR feature. While the hardware encoder 1660 and hardware decoder 1670 are shown as having different feature sets, in many cases there is a single piece of encoder/decoder hardware (e.g., the codec chip shown in FIG. 8), and thus the same features are supported for the encoder and decoder. Similarly, there is often a single codec software program, so the software encoder and decoder on a particular device will often support the same features.

The state diagram 1500 illustrates a number of situations in which the videoconferencing application elects to modify either the encoder, encoding features, or decoder used for an ongoing videoconference. For instance, when the network and/or device conditions result in a preference for a different encoder, the application transitions to state 1520 to select a new encoder. This might occur because a hardware encoder is preferred to a software encoder (or vice versa) due to conditions at the device (e.g., because a user is now running a memory and processor-intensive application), because networking conditions result in a preference for the use of a feature only supported by a particular encoder, because the current encoder is required for use by another application on the device, etc. A common scenario in some embodiments is that error-resilient features only supported by the software encoder are no longer needed due to an improvement in network conditions (or that the device has enough information to determine that the network conditions are good), and thus the device switches to using its hardware decoder for better performance.

After selecting the new encoder, the videoconferencing application transitions to state 1525 to select a new feature set for the current encoder. As was described in Section I.A above, the application will consider the features supported by the different decoders of the other device in the videoconference, and choose a set of features supported by at least one of those decoders. This may result in the same set of features or different set of features as was used by the previously selected encoder. In some cases, the application will have switched encoders specifically because a particular feature is needed or no longer needed (e.g., an error-resilient feature). After selecting the feature set, the application transitions back to state 1515 to continue encoding the outgoing bitstream using the new feature set and decoding the incoming bitstream.

The second stage 1630 of FIG. 16 illustrates the videoconference between devices 1600 and 1650 after conditions have changed at the first device 1600, causing that device to switch to using the hardware encoder 1610 rather than the software encoder 1605. This might occur because another application is taxing the processing resources of the device, and thus it switches to the less processor-intensive hardware encoder. Because the encoded video bitstream received at the first device 1600 is encoded using LTR, it cannot switch to using the hardware decoder 1620, as this decoder does not support LTR. As shown at this stage, the data transmitted to the second device 1650 includes an indication that the video bitstream will no longer be encoded using the LTR feature, allowing the second device 1650 to act accordingly. Some embodiments include information appended to each image in the bitstream indicating which features are used for encoding that image.

In some cases, the network and/or device conditions will result in a preference for different features available to the currently used encoder. In such a situation, the videoconferencing application transitions directly to state 1525 and selects a new set of features for the current encoder. This may involve a completely different set of features, or just turning on or off a feature. When the features change, an indication of the current features will be inserted into the outgoing bitstream that is transmitted to the other device participating in the videoconference. After selecting the feature set, the application transitions back to state 1515 to continue encoding the outgoing bitstream using the new feature set and decoding the incoming bitstream.

When either (i) the encoder is changed or (ii) the change in features will require a decoder change, some embodiments always transmit an I-frame (i.e., an image encoded without reference to any other images) as the first image. When the encoder is switched, the encoder will not have any previously encoded images to use as reference images for the new image. Similarly, in order to switch decoders, the I-frame is needed because the decoder will not have any previous images to refer to in decoding the new image. That is, the encoder has to "start over" as though the current image is the first image in the sequence of video images.

In addition to the conditions resulting in encoding changes, certain situations will result in the videoconferencing application changing which of the device's decoders to use. When the network or device conditions change, the videoconferencing application transitions to state 1530 to reprioritize the decoders. The application may reprioritize decoders for some of the same reasons as it switches encoders—e.g., because a hardware decoder is preferred to a software decoder (or vice versa) due to conditions at the device. In some embodiments, only local conditions are considered in prioritizing the decoders, and hardware decoders are always preferred to software decoders because the hardware decoders use less power and resources. However, when there are multiple software decoders, various operational conditions may exist that cause one to be preferable over another (e.g., a first decoder might be faster than a second decoder, but use more processor and memory resources).

After reprioritizing the decoders, the application transitions to state 1535 to select a decoder with the required features. It may be the case that there is only one decoder with the currently required features, and thus even though the application reprioritizes the decoders, it still only has a single actual choice. In some cases, though, the reprioritization will allow for a change to a different decoder. After selecting the new decoder, the application transitions back to state 1515 to continue encoding the outgoing bitstream and decoding the incoming bitstream using the newly selected decoder. In some embodiments, in order to switch decoders, the device must send out a message indicating this intention to the other device in the conference, so that the other device can accommodate the decoder switch by starting the encoding with an I-frame. This process is described in further detail below by reference to FIGS. 17 and 18.

In addition, when the other device participating in the videoconference modifies the features used to encode its outgoing bitstream, it sends out an indication as to the current feature set being used. When the videoconferencing application receives this information, the application transitions directly to state 1535 and selects a decoder with the required features. In some embodiments, the application selects the highest priority decoder in the current decoder list that has all of the required features. After selecting the new decoder, the application transitions back to state 1515 to continue encoding the outgoing bitstream and decoding the incoming bitstream using the newly selected decoder.

The third stage 1635 of FIG. 16 illustrates the effect of the second device 1650 receiving the indication from the first device 1600 that the first device is no longer encoding video using the LTR feature. As a result, the second device switches to using the hardware decoder 1670, which does not support LTR. This indicates that the hardware decoder 1670 was prioritized over the software decoder 1665.

The fourth stage 1640 illustrates the videoconference between the devices 1600 and 1650 after conditions have changed at the second device 1650, causing that device to switch both its encoder and its decoder. The second device switches from using the software encoder 1655 to using the hardware encoder 1660, and from using the hardware decoder 1670 to using the software decoder 1665. As shown, although the bitstream is now being encoded with a different encoder, no indication need be sent to the decoder unless the encoding features are different. While the application could direct the encoder 1660 to stop using the LTR feature, in this case it has not done so.

As mentioned, when the videoconferencing application of a receiving device determines that it needs to switch decoders, some embodiments send a synchronization message to the sending device in order to enable this switch. As described, even if all features currently used to encode the bitstream are supported by the new decoder, the sending device will still need to reset its image encoding pattern and transmit an I-frame to the receiving device.

Figure 17:
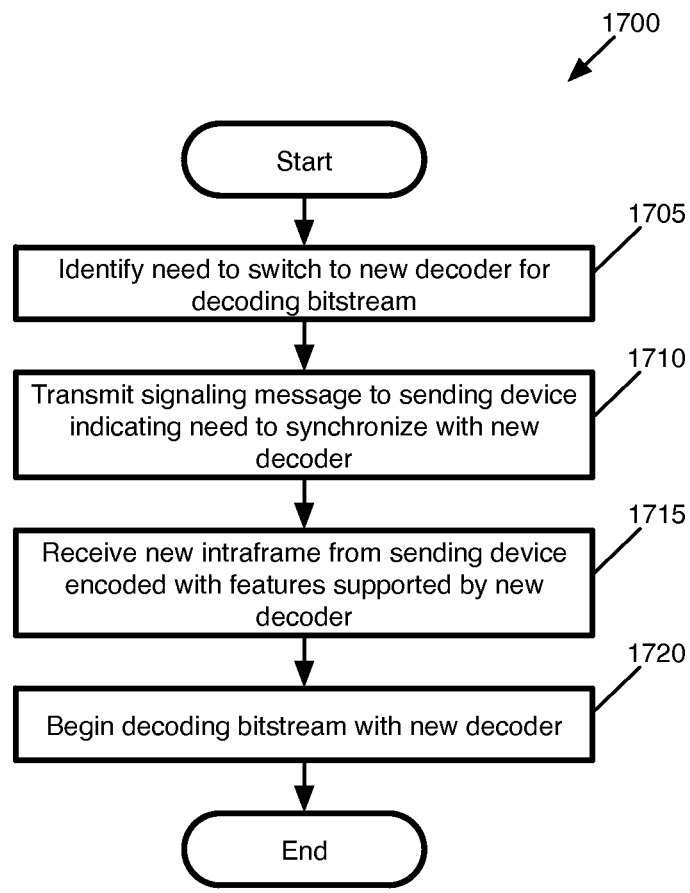
FIG. 17 conceptually illustrates a process of some embodiments for initiating a switch of decoders at a receiving device.

FIG. 17 conceptually illustrates a process 1700 of some embodiments for initiating a switch of decoders at a receiving device. The process 1700 will be described by reference to FIG. 18, which illustrates two devices participating in a videoconference over the course of four stages 1825-1840 in which one of the devices initiates a decoder switch.

Figure 18:
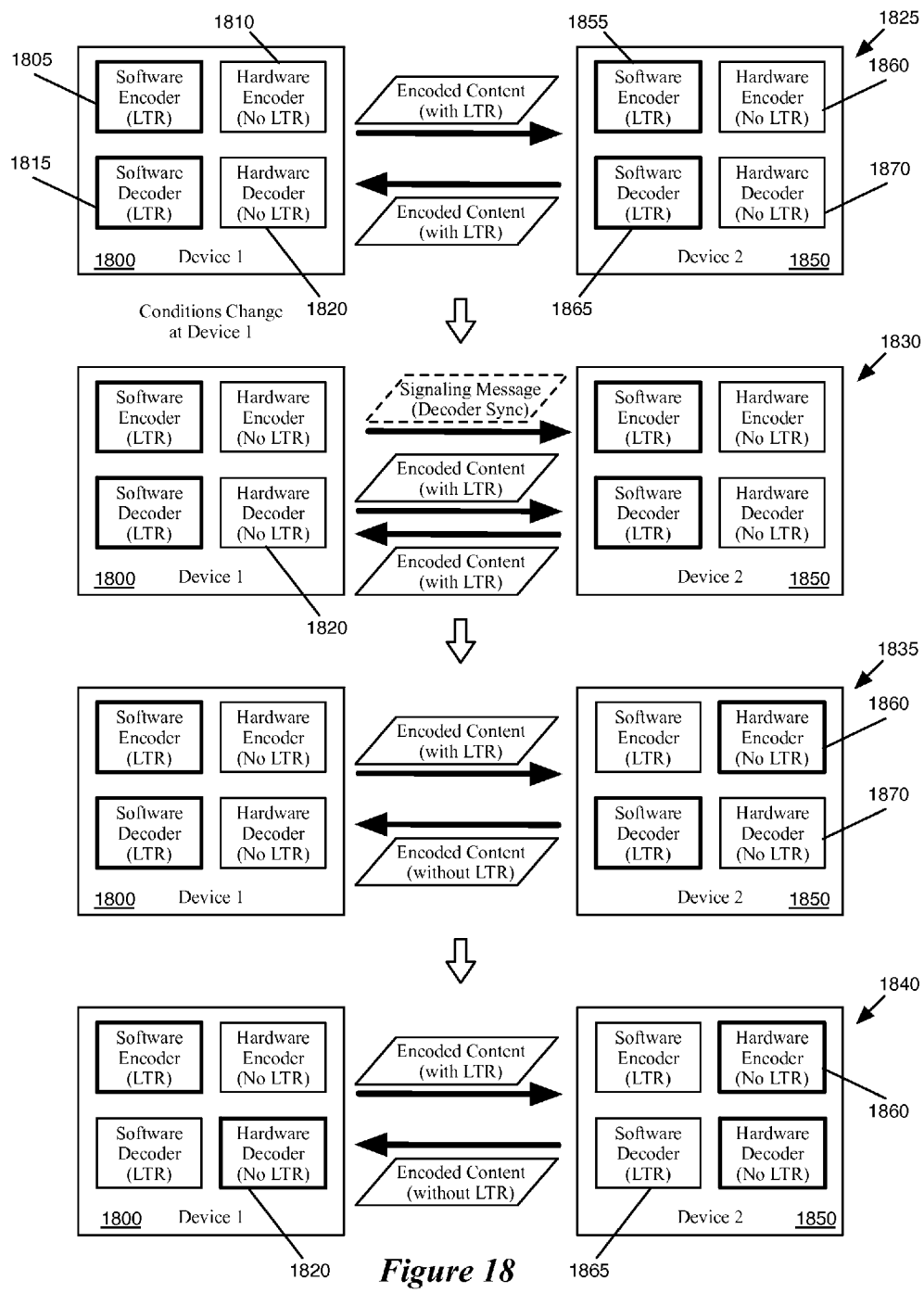
FIG. 18 conceptually illustrates two devices participating in a videoconference with each other over the course of four stages in which one device initiates a switch from one decoder to another.

FIG. 18 conceptually illustrates a first device 1800 and a second device 1850. Each device runs a videoconferencing application (not shown) and has two encoders and two decoders available to the videoconferencing application. The first device has a software encoder 1805 that supports the long-term reference frame (LTR) feature and a hardware encoder 1810 that does not support the LTR feature. The first device 1800 also has a software decoder 1815 that supports the LTR feature and a hardware decoder 1820 that does not support the LTR feature. The second device 1850 has a software encoder 1855 that supports the LTR feature and a hardware encoder 1860 that does not support the LTR feature. The second device 1850 also has a software decoder 1865 that supports the LTR feature and a hardware decoder 1670 that does not support the LTR feature.

The first stage 1825 of FIG. 18 illustrates the devices 1800 and 1850 in the middle of a videoconference. At this stage, both devices are using their software encoders 1805 and 1855 and software decoders 1815 and 1865. As indicated in the figure, both bitstreams of the videoconference are encoded using the LTR feature at this stage.

As shown, the process 1700 begins by identifying (at 1705) a need to switch to a new decoder for decoding the bitstream. For example, if the device is using a software decoder and the processing resources are heavily taxed such that the device's processor(s) cannot perform the decoding operations in time to properly display the incoming video, the videoconferencing application might attempt to switch to the hardware decoder. In some cases, the bitstream is decodable by both the current and new decoders, while in other cases the bitstream includes features not supported by the new decoder (in the discussion of the process 1700, the "new" decoder is the decoder to which the receiving device is attempting to switch).

Upon identifying the need to switch decoders, the process transmits (at 1710) a signaling message to the sending device indicating the need to synchronize with the new decoder. Some embodiments additionally include the decoding features supported by the new decoder in case specific features used to generate the current bitstream are not supported by the new decoder; however, other embodiments do not include this information because the sending device already has the information as it was provided during call signaling. As mentioned, the sending device cannot just switch decoders in some embodiments, as the new decoder requires an I-frame to begin its decoding process.

The second stage 1830 of FIG. 18 illustrates that the first device 1800 transmits a decoder synchronization signaling message in addition to the encoded content, while continuing to receive content encoded using the LTR feature. This decoder synchronization message is a result of a change in local conditions at the first device 1800, and requests that the second device 1850 begin encoding video decodable by the hardware decoder 1820. In this case, the change in conditions could be that the user started up an application on the first device 1800 which is monopolizing a significant portion of the processing resources of the device. In some cases, the first device 1800 would also switch to using its hardware encoder 1810 at the same time; for illustration purposes, this figure only shows the decoder switch.

The process 1700 next receives (at 1715) a new intraframe (i.e., an I-frame, or image encoded without reference to any other images) from the sending device. The sending device will have encoded this intraframe with features supported by the new decoder. In some cases, the sending device will also have switched encoders. For example, the third stage 1835 of FIG. 18 illustrates that the second device 1850 has switched to using the hardware encoder 1860. Because the selected encoder at the second device cannot continue to encode the bitstream using the LTR feature (as the first device's hardware decoder 1820 does not support the feature), the need to use the software encoder 1855 is reduced or eliminated.

In addition to switching encoders, at the third stage 1835 the second device 1850 is now transmitting content encoded without the use of the LTR feature. The hardware encoder 1860 initially encodes a first image as an I-frame, without reference to any other images. This is because the hardware encoder 1860 does not have any information available about previously encoded images to use as reference images, and because the hardware decoder 1820 similarly lacks any reference images and thus requires an intraframe in order to start decoding.

Once the intraframe is received for decoding by the new decoder, the process 1700 begins (at 1720) decoding the incoming bitstream with the new decoder. The fourth stage 1840 of FIG. 18 illustrates that the first device 1800 is now using the hardware decoder 1820 in order to decode the bitstream received from the second device 1850.

III. Message Formatting

Figure 19:
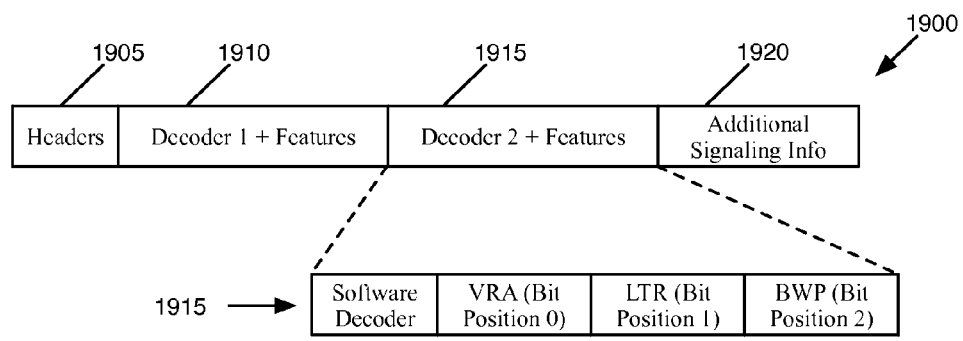
FIG. 19 conceptually illustrates a feature string message of some embodiments for a videoconference.

As described above, the receiving device of some embodiments transmits information about its available decoders to the sending device as a feature string. The sending device then encodes content as a bitstream and transmits the bitstream along with feature usage information. FIG. 19 conceptually illustrates a feature string message of some embodiments for a videoconference, while FIG. 20 conceptually illustrates the encoded bitstream for a video image according to some embodiments.

FIG. 19 conceptually illustrates a feature string message 1900 of some embodiments that a receiving device transmits to a sending device during the call signaling phase of a conference. As shown, the message 1900 includes headers 1905, a first decoder feature string 1910, a second decoder feature string 1915, and additional signaling information 1920. The headers 1905 of some embodiments include protocol headers (e.g., a TCP header, an IP header, etc.) as well as signaling headers indicating that the message is signaling information rather than data.

The decoder feature strings 1910 and 1915 indicate the presence of a particular decoder at the receiving device and the features supported by that decoder. In addition, in some embodiments the feature string for a decoder indicates how the sending device should provide information about which features are used to encode each image. The message 1900 includes information about two decoders, but one of ordinary skill will recognize that in some embodiments the message may include information about any number of decoders available to the videoconferencing application at the receiving device.

The figure illustrates an expanded view of the decoder feature string 1915. As shown, the second decoder feature string 1915 indicates that the decoder is a software decoder with three features: video resolution adaptation (VRA), long-term reference frame (LTR), and bandwidth probing (BWP). Some embodiments use a code for each feature (e.g., a 4-bit code, 8-bit code, etc.), while other embodiments indicate the features differently.

In addition, for each of these features, the feature string indicates a bit position. This bit position is used by the sending device in some embodiments to indicate to the receiving device which features are used to encode a particular image, as described further by reference to FIG. 20 below. In this case, the VRA feature uses bit position 0, the LTR feature uses bit position 1, and the BWP feature uses bit position 2.

In some cases, the same feature will be supported by more than one decoder at the receiving device. For example, the first decoder feature string 1910 might indicate that the hardware decoder of the receiving device also supports the BWP feature. If the bit position of the BWP feature is not coordinated between the two decoders, then the sending device could encode a sequence of images using only the BWP feature, but would restrict the ability of the sending device to choose one encoder over the other based on the bit position used for the feature. Thus, some embodiments coordinate the bit positions for features between the two decoders. For example, if the first decoder supports the adaptive sharpening feature and the bandwidth probing feature, the BWP feature would be assigned to bit position 2 and the adaptive sharpening feature assigned to bit position 3. A sequence of images encoded using the BWP feature could then be decoded by either of the decoders.

On the other hand, some embodiments use separate sets of bit positions for each encoder (e.g., in the situation above, the first encoder feature string 1910 might indicate bit position 0 for the adaptive sharpening and bit position 1 for the BWP feature). In such embodiments, the sending device may specify a particular decoder to which it is sending the encoded bitstream and then specify the features used in encoding the bitstream.

Figure 20:
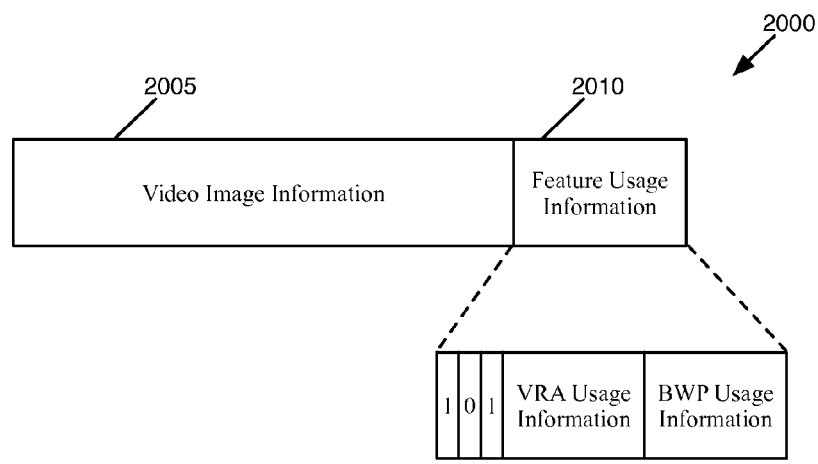
FIG. 20 conceptually illustrates the encoded bitstream for a video image according to some embodiments.

FIG. 20 conceptually illustrates the bitstream 2000 for an image encoded by a sending device for a videoconference according to some embodiments. In some embodiments, this image is not transmitted as a single message, but rather may be split up into multiple packets, each with its own header information. As shown, the bitstream 2000 includes video image information 2005 and feature usage information 2010. The video image information 2005 includes the actual encoded image. In some embodiments, the feature usage information 2010 is transmitted in an out-of-band logical channel as described in U.S. patent application Ser. No. 12/895,740, entitled "Method and Apparatus for Adaptive Video Sharpening", filed Sep. 30, 2010, by Douglas Scott Price, Xiaosong Zhou, Hsi-Jung Wu, and Jim Normile, and now published as U.S. Pat. publication No. 2011/0299604, which is incorporated herein by reference.

As shown, the feature usage information 2010 includes an initial three bits (1, 0, 1) that indicate which features are used to encode the video image information 2005. In this case, referring to the bit positions given in FIG. 19, the VRA and BWP features were used by the encoder to encode this particular image. Accordingly, the feature usage information 2010 additionally includes VRA usage information and BWP usage information. This information, in some embodiments, indicates to the decoder how the features were used. For instance, for the VRA feature, it might indicate the resolution of the current image, which is information the decoder needs to properly decode the image.

IV. Video-Conferencing Application

Many of the above figures (e.g., FIGS. 13, 14, etc.) conceptually illustrate devices (e.g., smart phones, tablets, laptop computers, desktop computers, etc.) participating in a videoconference, but only show the encoders and decoders (both hardware and software) of the devices. One of ordinary skill in the art will recognize that many additional features are present on the videoconference participant devices in some embodiments. These features may include hardware (e.g., one or more cameras, a CPU for performing operations specified by the software decoder, etc.) and software (e.g., a videoconferencing application, a videoconferencing module that is part of the device operating system, etc.).

Figure 21:
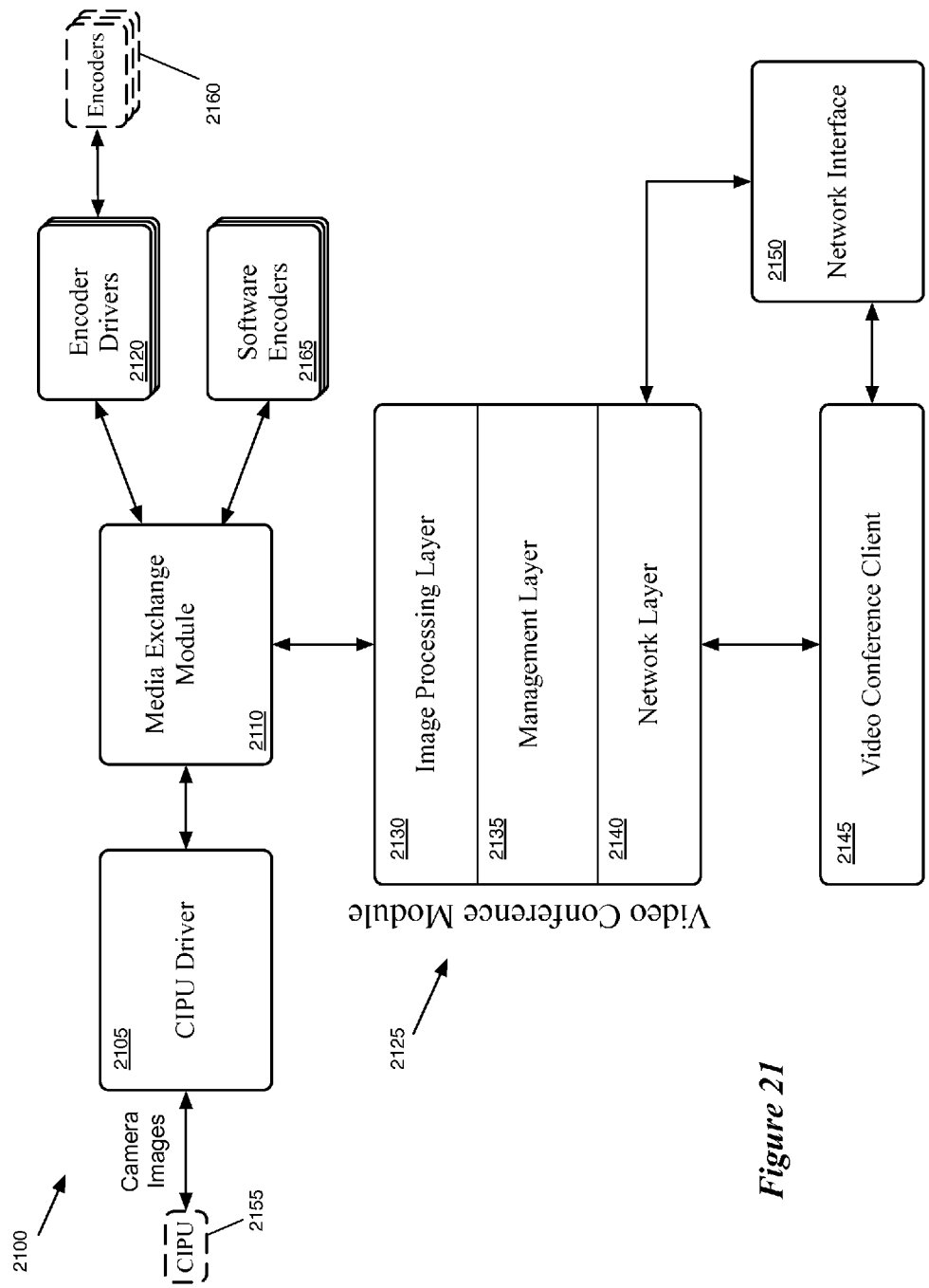
FIG. 21 conceptually illustrates a software architecture for a video conferencing and processing module of a device of some embodiments.

FIG. 21 conceptually illustrates a software architecture for a video conferencing and processing module 2100 of a device of some embodiments. The device may have an integrated camera (or multiple cameras) or may have a camera attached for capturing the images to be transmitted to other participants (i.e., other devices) in a video conference. The video conferencing and processing module 2100 includes a CIPU driver 2105, a media exchange module 2110, and a set of encoder drivers 2120. The video conferencing and processing module 2100 also includes a video conference module 2125, a video conference client 2145, and a network interface 2150 for performing a variety of video conferencing functions. The video conferencing and processing module 2100 processes and encodes images that are captured by the camera or cameras at the device.

The media exchange module 2110 allows consumers and producers of media content in the device to exchange media content and instructions regarding the processing of the media content, the CIPU driver 2105 serves as a communication interface with the captured image processing unit (CIPU) 2155, and the encoder drivers 2120 serve as communication interfaces with hardware encoders 2160 (e.g., one or more encoder chips, encoding components on a system on chip, etc.). In addition, some embodiments include one or more software encoders 2165. The software encoders may be part of the video conferencing and processing module 2100 in some embodiments or may be separate software within the device (e.g., part of the operating system, a separate application, etc.). In some embodiments, the video conferencing and processing module 2100 specifies which encoder should encode the video, and which encoding features of the specified encoder should be used.

The video conference module 2125 of some embodiments handles various video conferencing functions such as image processing, video conference management, and networking. As shown, the video conference module 2125 interacts with the media exchange module 2110, the video conference client 2145, and the network interface 2150. In some embodiments, the video conference module 2125 receives instructions from and sends instructions to the video conference client 2145. The video conference module 2125 of some embodiments also sends data to and receives data from networks (e.g., a local area network (LAN), a wireless local area network (WLAN), a wide area network (WAN), a network of networks, a code division multiple access (CDMA) network, a GSM network, etc.) through the network interface 2150.

The video conference module 2125 includes an image processing layer 2130, a management layer 2135, and a network layer 2140. In some embodiments, the image processing layer 2130 performs image processing operations on images for video conferencing (i.e., operations that involve the manipulation of pixel values of the images). For example, the image processing layer 2130 of some embodiments performs exposure adjustment, image resizing, perspective correction, and dynamic range adjustment operations. The image processing layer 2130 of some embodiments sends requests through the media exchange module 2110 for images from the CIPU 2155.

The management layer 2135 of some embodiments controls the operation of the video conference module 2125. For instance, in some embodiments, the management layer 2135 initializes one or more cameras at the device, processes images and audio to transmit to a remote device, and processes images and audio received from the remote device. In some embodiments, the management layer 2135 generates composite (e.g., PIP) displays for the device. Moreover, the management layer 2135 may change the operation of the video conference module 2125 based on networking reports received from the network layer 2140. The management layer 2135 of some embodiments performs the determinations described in the sections above, analyzing network data and local operational data to determine which encoder, encoding features, and decoder should be used for the video conference (i.e., includes an encoder and feature selector such as that shown in FIG. 5 and a decoder selector such as that shown in FIG. 12).

In some embodiments, the network layer 2140 performs some or all of the networking functionalities for video conferencing. For instance, the network layer 2140 of some embodiments establishes a network connection (not shown) between the local device and a remote device of a video conference, exchanges feature strings with the remote device, transmits images to the remote device, and receives images from the remote device, among other functionalities. In addition, the network layer 2140 receives networking data such as packet loss, one-way latency, and round-trip delay time, among other types of data, processes such data, and reports the data to the management layer 2135. This data is passed to the management layer 2135, in some embodiments, so that the management layer can use this data (as well as local data obtained from, e.g., the device's operating system) to determine which encoder and which of its features to use for encoding the images to transmit to the remote device.

The video conference client 2145 of some embodiments is an application that may use the video conferencing functions of the video conference module 2125 such as a video conferencing application, a voice-over-IP (VoIP) application (e.g., Skype), or an instant messaging application. In some embodiments, the video conference client 2145 is a stand-alone application while in other embodiments the video conference client 2145 is integrated into another application or the device operating system.

In some embodiments, the network interface 2150 is a communication interface that allows the video conference module 2125 and the video conference client 2145 to send data and receive data over a network (e.g., a cellular network, a local area network, a wireless network, a network of networks, the Internet, etc.) through the network interface 2150. For instance, if the video conference module 2125 wants to send data (e.g., images captured by one or more cameras of the device) to another device on the Internet, the video conference module 2125 sends the images to the other device through the network interface 2150.

Figure 22:
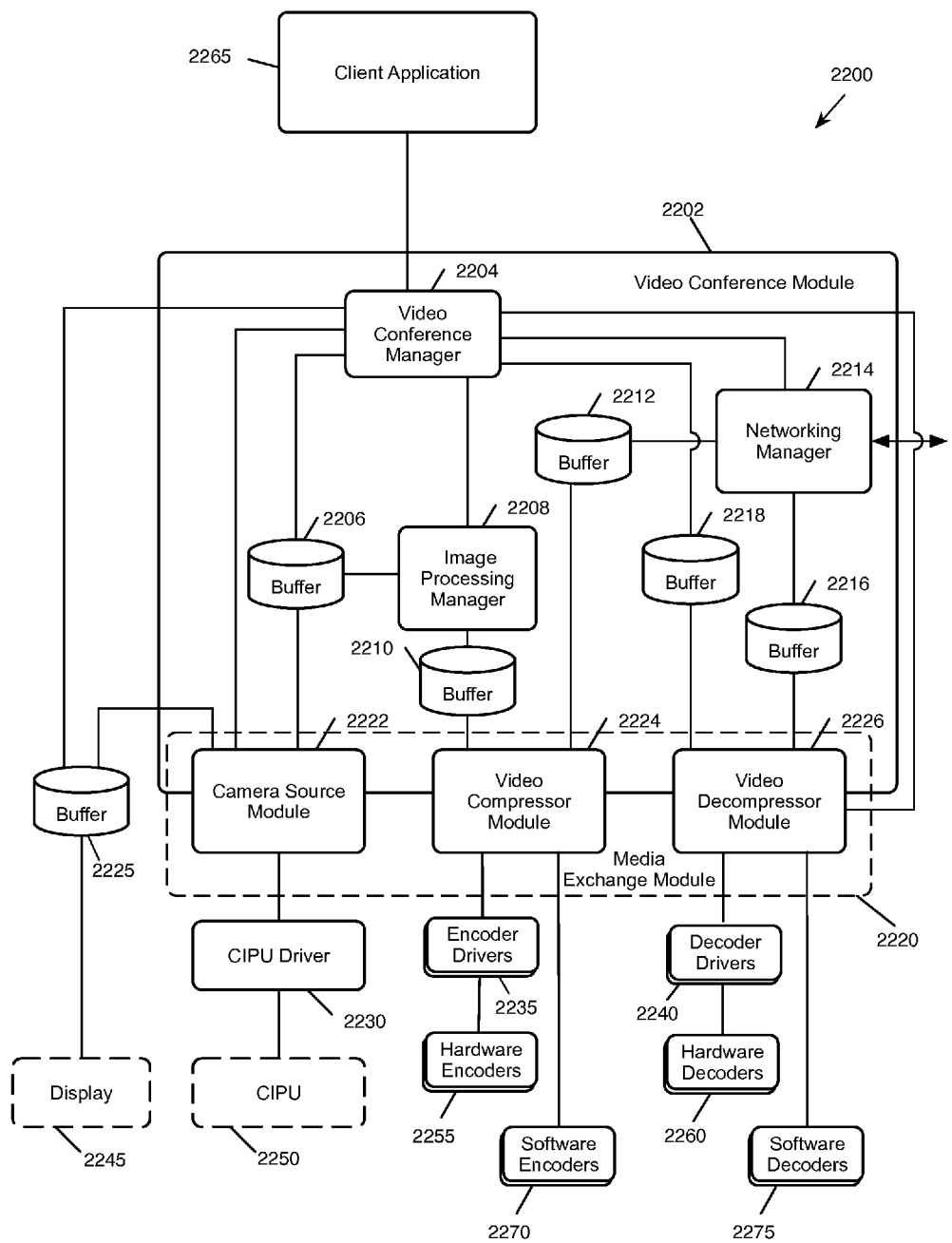
FIG. 22 conceptually illustrates a software architecture for a video conferencing and processing system of a device of some embodiments that illustrates the video conference module in further detail.

FIG. 22 conceptually illustrates a software architecture for a video conferencing and processing system 2200 of a device of some embodiments that illustrates the video conference module in further detail. As shown, the video conferencing and processing system 2200 includes a client application 2265, a video conference module 2202, a media exchange module 2220, a buffer 2225, a captured image processing unit (CIPU) driver 2230, a set of encoder drivers 2235, and a set of decoder drivers 2240. In some embodiments, the buffer 2225 is a frame buffer that stores images of a video for display on a display 2245 at the device (that may be connected to the device or integrated into the device).

In some embodiments, the client application 2265 is the same as the video conference client 2145 of FIG. 21. As mentioned above, the client application 2265 may be integrated into another application or implemented as a stand-alone application. The client application 2265 may be an application that uses the video conferencing functions of the video conference module 2202, such as a video conferencing application, a voice-over-IP (VOIP) application (e.g., Skype), or an instant messaging application.

The client application 2265 of some embodiments sends instructions to the video conference module 2202 such as instructions to start a conference and end a conference, receives instructions from the video conference module 2202, routes instructions from a user of the device to the video conference module 2202, and generates user interfaces that are displayed on the display device and allow a user to interact with the application.

As shown in FIG. 22, the video conference module 2202 includes a video conference manager 2204, an image processing manager 2208, a networking manager 2214, and buffers 2206, 2210, 2212, 2216, and 2218. In some embodiments, the video conference module 2202 is the same as the video conference module 2125 illustrated in FIG. 21 and thus performs some or all of the same functions described above for the video conference module 2125.

In some embodiments, the video conference manager 2204 is responsible for initializing some or all of the other modules of the video conference module 2202 (e.g., the image processing manager 2208 and the networking manager 2214) when a video conference is starting, controlling the operation of the video conference module 2202 during the video conference, and ceasing the operation of some or all of the other modules of the video conference module 2202 when the video conference is ending.

The video conference manager 2204 of some embodiments also processes images received from one or more devices in the video conference and images captured by any cameras of the device for display on the display device 2245. For instance, the video conference manager 2204 of some embodiments retrieves decoded images, received from another device participating in the video conference, from the buffer 2218 and retrieves images processed by CIPU 2250 (i.e., images captured by the dual camera mobile device) from the buffer 2206. In some embodiments, the video conference manager 2204 also scales and composites the images before displaying the images on the display. That is, the video conference manager 2204 generates PIP or other composite views to display at the device in some embodiments. Some embodiments scale the images retrieved from the buffers 2206 and 2218 while other embodiments just scale images retrieved from one of the buffers 2206 and 2218.

In addition, as described above, the video conference manager 2204 of some embodiments retrieves network statistics information from the networking manager 2214 and device operating conditions from the operating system of the device (not shown). Along with feature strings of the remote device received through the networking manager 2214 and information about the encoders and decoders 2255, 2260, 2270, and 2275, the video conference manager 2204 makes decisions about which encoder and decoder to use. The video conference manager 2204 determines which encoder of encoders 2255 and 2270 should be used to encode the video captured through the CIPU 2250, as well as which features of those encoders should be used, and instructs the image processing manager 2208 accordingly (or directly instructs the video compressor module 2224).

The video conference manager also determines which decoder of decoders 2260 and 2275 should be used to decode the video received through the networking manager 2214, and instructs the video decompressor module 2226 accordingly.

Although FIG. 22 illustrates the video conference manager 2204 as part of the video conference module 2202, some embodiments of the video conference manager 2204 are implemented as a component separate from the video conference module 2202. As such, a single video conference manager 2204 can be used to manage and control several video conference modules 2202. For instance, some embodiments will run a separate video conference module on the local device to interact with each party in a multi-party conference, and each of these video conference modules on the local device are managed and controlled by the one video conference manager.

The image processing manager 2208 of some embodiments processes images captured by the cameras at the local device before the images are encoded by the encoder 2255. For example, some embodiments of the image processing manager 2208 perform one or more of exposure adjustment, focus adjustment, perspective correction, dynamic range adjustment, and image resizing on images processed by the CIPU 2250. In some embodiments, the image processing manager 2208 controls the frame rate of encoded images that are transmitted to the other device in the video conference.

Some embodiments of the networking manager 2214 manage one or more connections between the local device and the other device or devices participating in the video conference. For example, the networking manager 2214 of some embodiments establishes the connections between the local device and the other device of the video conference at the start of the video conference and tears down these connections at the end of the video conference.

During the video conference, the networking manager 2214 transmits images encoded by the encoder 2255 to the other device of the video conference and routes images received from the other device of the video conference to decoder 2260 for decoding. In some embodiments, the networking manager 2214, rather than the image processing manager 2208, controls the frame rate of the images that are transmitted to the other device of the video conference. For example, some such embodiments of the networking manager 2214 control the frame rate by dropping (i.e., not transmitting) some of the encoded frames that are supposed to be transmitted to the other device of the video conference.

As shown, the media exchange module 2220 of some embodiments includes a camera source module 2222, a video compressor module 2224, and a video decompressor module 2226. The camera source module 2222 routes messages and media content between the video conference module 2202 and the CIPU 2250 through the CIPU driver 2230, the video compressor module 2224 routes message and media content between the video conference module 2202 and the encoders 2255 and 2270 (through the encoder drivers 2235 for the hardware encoders 2255), and the video decompressor module 2226 routes messages and media content between the video conference module 2202 and the decoders 2260 (through the decoder driver) and 2275.

The decoder drivers 2240 of some embodiments act as communication interfaces between the video decompressor module 2226 and hardware decoders 2260. The decoders 2260 and/or 2275 decode images received from the remote device of the video conference through the networking manager 2214 and routed through the video decompressor module 2226. After the images are decoded, they are sent back to the video conference module 2202 through the video decompressor module 2226 (and, if a hardware decoder is being used, the decoder driver 2240). In some embodiments, the encoder drivers 2235 act as communication interfaces between the video compressor module 2224 and hardware encoders 2255. The encoders 2255 and 2270 encode images captured by the camera at the device and send the encoded images through the video compressor module 2224 (and, if a hardware encoder is being used, the encoder drivers 2235) to the buffer 2212 for transmission to the remote device.

V. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 23:
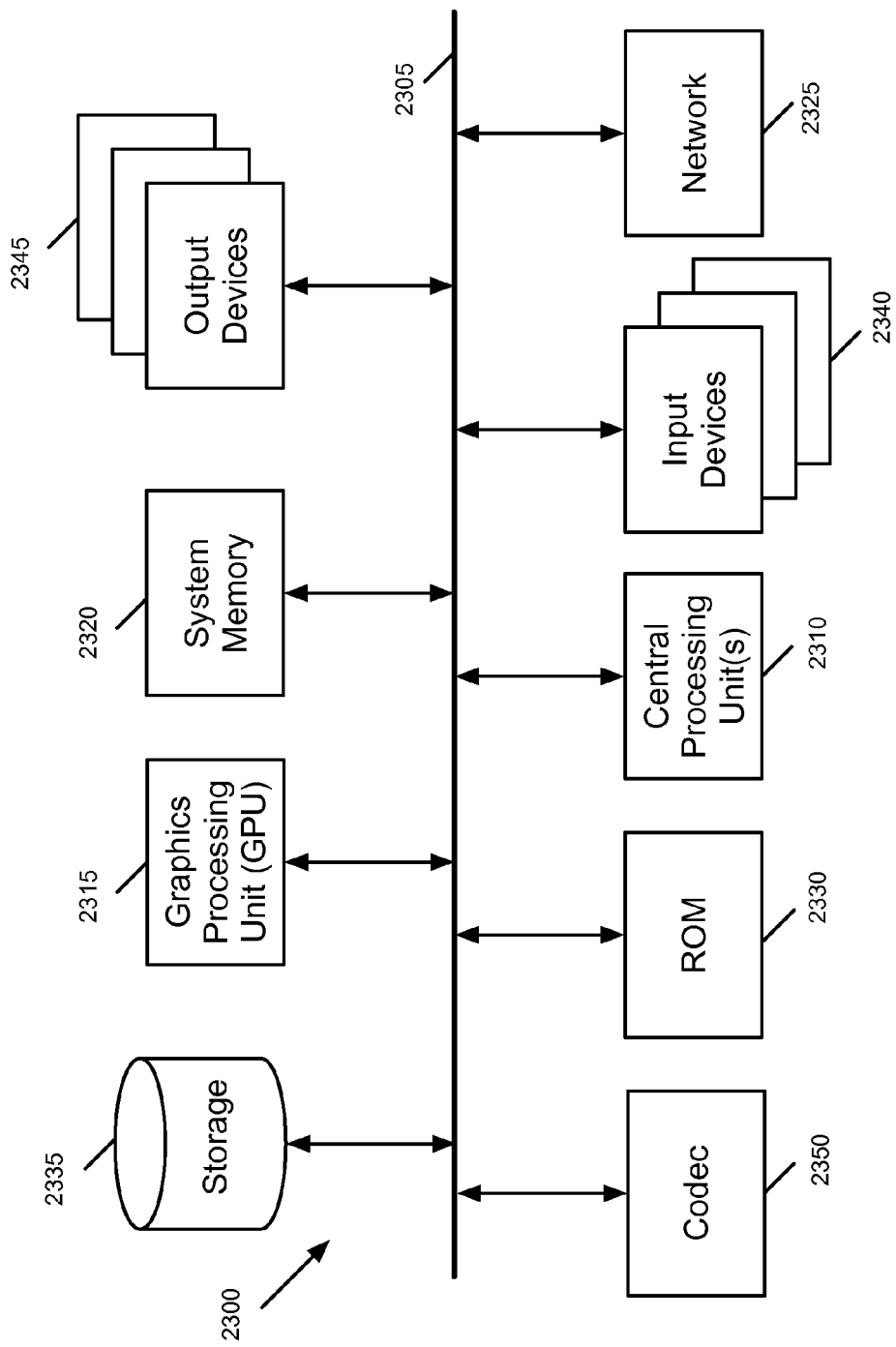
FIG. 23 conceptually illustrates an electronic system with which some embodiments of the invention are implemented.

FIG. 23 conceptually illustrates an electronic system 2300 with which some embodiments of the invention are implemented. The electronic system 2300 may be a computer (e.g., a desktop computer, personal computer, tablet computer, etc.), phone (e.g., a smart phone), PDA, or any other sort of electronic or computing device. Such an electronic system includes various types of computer readable media and interfaces for various other types of computer readable media. Electronic system 2300 includes a bus 2305, processing unit(s) 2310, a graphics processing unit (GPU) 2315, a system memory 2320, a network 2325, a read-only memory 2330, a permanent storage device 2335, input devices 2340, output devices 2345, and codec 2350.

The bus 2305 collectively represents all system, peripheral, and chipset buses that communicatively connect the numerous internal devices of the electronic system 2300. For instance, the bus 2305 communicatively connects the processing unit(s) 2310 with the read-only memory 2330, the GPU 2315, the system memory 2320, the permanent storage device 2335, and the codec 2350.

From the various memory units, the processing unit(s) 2310 retrieves instructions to execute and data to process in order to execute the processes of the invention. The processing unit(s) may be a single processor or a multi-core processor in different embodiments. Some instructions are passed to and executed by the GPU 2315. The GPU 2315 can offload various computations or complement the image processing provided by the processing unit(s) 2310. In some embodiments, such functionality can be provided using CoreImage's kernel shading language. Some image encoding and decoding operations are performed by the codec 2350, which is a separate chip (e.g., an application-specific integrated circuit) in some embodiments.

The read-only-memory (ROM) 2330 stores static data and instructions that are needed by the processing unit(s) 2310 and other modules of the electronic system. The permanent storage device 2335, on the other hand, is a read-and-write memory device. This device is a non-volatile memory unit that stores instructions and data even when the electronic system 2300 is off. Some embodiments of the invention use a mass-storage device (such as a magnetic or optical disk and its corresponding disk drive) as the permanent storage device 2335.

Other embodiments use a removable storage device (such as a floppy disk, flash memory device, etc., and its corresponding drive) as the permanent storage device. Like the permanent storage device 2335, the system memory 2320 is a read-and-write memory device. However, unlike storage device 2335, the system memory 2320 is a volatile read-and-write memory, such a random access memory. The system memory 2320 stores some of the instructions and data that the processor needs at runtime. In some embodiments, the invention's processes are stored in the system memory 2320, the permanent storage device 2335, and/or the read-only memory 2330. For example, the various memory units include instructions for processing multimedia clips in accordance with some embodiments. From these various memory units, the processing unit(s) 2310 retrieves instructions to execute and data to process in order to execute the processes of some embodiments.

The bus 2305 also connects to the input and output devices 2340 and 2345. The input devices 2340 enable the user to communicate information and select commands to the electronic system. The input devices 2340 include alphanumeric keyboards and pointing devices (also called "cursor control devices"), cameras (e.g., webcams), microphones or similar devices for receiving voice commands, etc. The output devices 2345 display images generated by the electronic system or otherwise output data. The output devices 2345 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 23, bus 2305 also couples electronic system 2300 to a network 2325 through a network adapter (not shown). In this manner, the computer can be a part of a network of computers (such as a local area network ("LAN"), a wide area network ("WAN"), or an Intranet, or a network of networks, such as the Internet). Any or all components of electronic system 2300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some cases, the codec 2350 is such an integrated circuit. In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 2, 6, 9, and 17) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a first device participating in a video communications session with a second device, a method comprising:
   receiving sets of encoding features supported by each of one or more decoders of the second device;
   selecting, while initiating the video communications session with the second device, (i) a first encoder for the video communications session from a plurality of encoders available to the first device, the plurality of encoders comprising at least one hardware encoder and at least one software encoder, and (ii) a set of encoding features of the selected first encoder, the selections based on the sets of encoding features received from the second device;

encoding a video bitstream in a particular encoding format using the selected set of encoding features of the first encoder;

transmitting an encoded video bitstream to the second device along with information identifying the selected features in order for the second device to select a decoder to decode the encoded video bitstream;

detecting a change in conditions at the first device; and selecting, in response to the detected change, a second, separate encoder for encoding subsequent images of the video bitstream in the same particular encoding format using a different set of encoding features supported by the second encoder.

2. The method of claim 1, wherein the method is performed by a video-conferencing application of the device.

3. The method of claim 1, wherein the selections of the encoders and the sets of encoding features are further based on a combination of current resource usage at the first device, conditions of a network connection between the first device and the second device, and encoding features supported by the selected encoders.

4. The method of claim 1, wherein at least one hardware encoder does not support a set of error resilient features and at least one software encoder supports the set of error resilient features, wherein when conditions of a network connection between the first device and the second device are better than a threshold level, selecting the first encoder comprises selecting the hardware encoder.

5. The method of claim 1, wherein at least one hardware encoder does not support a set of error resilient features and at least one software encoder supports the set of error resilient features, wherein when conditions of a network connection between the first device and the second device are worse than a threshold level, selecting the first encoder comprises selecting the software encoder and selecting the set of encoding features comprises selecting the set of error resilient features.

6. The method of claim 1, wherein the encoding features comprise at least one of video resolution adaptation, long-term reference frame, bandwidth probing, and adaptive sharpening.

7. The method of claim 1, wherein selecting the set of encoding features comprises selecting a set of features supported by the selected encoder and by at least one decoder of the second device.

8. The method of claim 1, wherein selecting the set of encoding features comprises:

determining all features supported by the selected first encoder;

identifying subsets of the features, each subset supported by at least one decoder of the second device; and selecting one of the subsets as the set of encoding features.

9. The method of claim 8, wherein one of the subsets comprises all features supported by the selected first encoder.

10. The method of claim 8, wherein selecting one of the subsets comprises:

ranking the subsets; and selecting the subset with the highest rank.

11. The method of claim 1, wherein the features modify the encoded bitstream for a given encoding format.

12. The method of claim 11, wherein the encoding format is H.264.

13. The method of claim 1 further comprising encoding a sequence of images captured at the first device as the encoded video bitstream using the selected encoder.

14. The method of claim 1, wherein the software encoder supports a set of error-resilient features and the hardware encoder does not support the set of error-resilient features, wherein the detected change is an increase of packets being dropped from the transmitted encoded video bitstream, and selecting a second encoder comprises switching from the hardware encoder to the software encoder in order to use the set of error-resilient features.

15. A non-transitory machine readable medium of a first device, the machine readable medium storing a video conferencing application which when executed by at least one processing unit of the first device participates in a video-conference with a second device, the video conferencing application comprising sets of instructions for:

transmitting, to the second device, sets of encoding features supported by each of a plurality of decoders of the first device, the plurality of decoders comprising at least one hardware decoder and at least one software decoder that both decode bitstreams encoded in a same particular encoding format, wherein the second device uses the sets of encoding features to select an encoder from a plurality of encoders while initiating the video-conference with the first device;

receiving an encoded video bitstream from the second device along with a set of features used to encode the bitstream at the second device in the particular encoding format;

based on the set of features used to encode the bitstream, selecting a first decoder from the plurality of decoders at the first device for decoding the bitstream from the second device by selecting a highest priority decoder of the plurality of decoders that supports all features used to encode the bitstream; and in response to receiving a modified bitstream during the video conference, selecting a second, separate decoder of the plurality of decoders that supports all of the features used to encode the modified bitstream.

16. The non-transitory machine readable medium of claim 15, wherein the set of instructions for selecting a decoder comprises a set of instructions for ranking the decoders in order of priority.

17. The non-transitory machine readable medium of claim 16, wherein the decoder ranking is based on current resource usage at the first device.

18. The non-transitory machine readable medium of claim 15, wherein the hardware decoder has a higher priority than the software decoder.

19. The non-transitory machine readable medium of claim 15, wherein the video conferencing application further comprises sets of instructions for:

receiving sets of encoding features supported by each of one or more decoders of the second device;

selecting (i) an encoder for the videoconference from a plurality of encoders available to the first device and (ii) a set of encoding features of the selected encoder based on the sets of encoding features supported by the decoders of the second device; and transmitting an encoded video bitstream to the second device.

20. The non-transitory machine readable medium of claim 15, wherein the set of instructions for transmitting the sets of encoding features comprises a set of instructions for transmitting a feature string that lists the encoding features of a particular encoder and specifies how the second device should indicate to the first device which of the encoding features are used to generate the encoded video bitstream.

21. The non-transitory machine readable medium of claim 15, wherein the set of instructions for selecting a second, separate decoder comprises sets of instructions for:
- determining a need to switch from the first selected decoder to a different decoder of the plurality of decoders;
- sending a decoder synchronization message to the second device that indicates the need to use the different decoder; and
- upon receiving the modified video bitstream that comprises a first image encoded without reference to any other images from the second device, using the second, separate decoder to decode the bitstream.

22. A non-transitory machine readable medium of a first device, the machine readable medium storing a video conferencing application which when executed by at least one processing unit participates in a videoconference with a second device, the video conferencing application comprising sets of instructions for:
- selecting, while initiating the videoconference with the second device, (i) a first encoder from a plurality of encoders available to the first device and (ii) a set of encoding features supported by the selected first encoder, the selections based on features supported by decoders of the second device;
- with the selected first encoder, encoding video images, captured at the first device, in a particular encoding format using the set of encoding features;
- detecting a change in conditions at the first device; and
- selecting, in response to the detected change, a second, separate encoder for encoding subsequent video images in the same particular encoding format using a different set of encoding features supported by the second encoder.

23. The non-transitory machine readable medium of claim 22, wherein the encoding features comprise at least one of video resolution adaptation, long-term reference frame, bandwidth probing, and adaptive sharpening.

24. The non-transitory computer readable medium of claim 22, wherein the change in conditions comprises an increase in a packet loss rate between the first device and the second device, and the set of instructions for selecting a different set of encoding features comprises a set of instructions for selecting an error resilient feature.

25. The non-transitory machine readable medium of claim 22, wherein the first encoder selected at initiation is a software encoder, wherein the detected change in conditions comprises a decrease in quality of network conditions, and the set of instructions for selecting a second encoder and set of encoding features comprises a set of instructions for selecting a hardware encoder that does not support a particular error resilient feature supported by the software encoder.

26. For a first device participating in a videoconference with a second device, a method comprising:
- selecting, while initiating the videoconference with the second device, an encoder from a plurality of encoders of the first device and a first set of encoding features supported by the selected encoder based on network conditions between the first device and second device, local resource usage at the first device, power consumption by the different encoders, and encoding features supported by decoders of the second device, the selected encoder for encoding a first video bitstream;
- transmitting, to the second device, the first video bitstream encoded by the selected encoder during the videoconference;
- receiving, from the second device, a second video bitstream encoded by an encoder of the second device during the video conference with a second set of encoding features, wherein the first set of encoding features is different from the second set of encoding features; and
- selecting a decoder from a plurality of decoders at the first device based on a priority order of the plurality of decoders and the second set of encoding features used to encode the second video bitstream.

27. The method of claim 26, wherein the plurality of encoders comprises a software encoder and a hardware encoder, wherein the software encoder supports more features than the hardware encoder and the hardware encoder uses less power and resources than the software encoder.

28. The method of claim 27, wherein the resources comprise memory and processor resources.

29. The method of claim 26, wherein the plurality of decoders comprises a software decoder and a hardware decoder, wherein the hardware decoder is ahead of the software decoder in the priority order.

30. The method of claim 26, wherein the selected encoder is a hardware encoder and the selected decoder is a software decoder.

31. The method of claim 26, wherein the selected encoder is a software encoder and the selected decoder is a hardware decoder.

* * * * *